(12) United States Patent
Harel et al.

(10) Patent No.: US 8,634,355 B2
(45) Date of Patent: Jan. 21, 2014

(54) BURST SIZE SIGNALING AND PARTITION RULE

(75) Inventors: Tom Harel, Shfaim (IL); Yuval Lomnitz, Herzelia (IL); Changlong Xu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 360 days.

(21) Appl. No.: 12/715,920

(22) Filed: Mar. 2, 2010

(65) Prior Publication Data

US 2010/0226329 A1 Sep. 9, 2010

Related U.S. Application Data

(60) Provisional application No. 61/156,882, filed on Mar. 3, 2009.

(51) Int. Cl.
*H04W 4/00* (2009.01)
*H04J 1/00* (2006.01)
*H04M 1/00* (2006.01)

(52) U.S. Cl.
USPC ........... 370/329; 370/318; 370/319; 370/328; 370/334; 370/343; 455/435.1; 455/525; 455/561

(58) Field of Classification Search
USPC ................................. 370/318–561
See application file for complete search history.

(56) References Cited

U.S. PATENT DOCUMENTS

| | | | | |
|---|---|---|---|---|
| 7,593,732 B2 * | 9/2009 | Kim et al. | | 455/436 |
| 7,630,355 B2 * | 12/2009 | Tao et al. | | 370/343 |
| 7,725,796 B2 * | 5/2010 | Ihm et al. | | 714/751 |
| 7,751,356 B2 * | 7/2010 | Kim et al. | | 370/311 |
| 7,894,449 B2 * | 2/2011 | Mohanty | | 370/395.3 |
| 7,912,425 B2 * | 3/2011 | Ihm et al. | | 455/39 |
| 7,961,696 B2 * | 6/2011 | Ma et al. | | 370/344 |
| 7,986,633 B2 * | 7/2011 | Ryu et al. | | 370/252 |
| 8,040,831 B2 * | 10/2011 | Kurtz et al. | | 370/318 |
| 8,130,728 B1 * | 3/2012 | Dinan et al. | | 370/335 |
| 8,131,286 B2 * | 3/2012 | Diepstraten et al. | | 455/426.1 |
| 8,259,668 B2 * | 9/2012 | Beems Hart et al. | | 370/330 |
| 8,301,952 B2 * | 10/2012 | Lee et al. | | 714/748 |
| 8,320,320 B2 * | 11/2012 | Caretti et al. | | 370/329 |
| 8,379,510 B2 * | 2/2013 | Kim et al. | | 370/216 |

(Continued)

FOREIGN PATENT DOCUMENTS

| | | | |
|---|---|---|---|
| KR | 2009014727 A | * | 2/2009 |
| WO | 2008/078394 A1 | | 7/2008 |
| WO | 2010/101978 A2 | | 9/2010 |
| WO | 2010/101978 A3 | | 1/2011 |

OTHER PUBLICATIONS

International Preliminary Report on Patentability Received for PCT Patent Application No. PCT/US2010/026015, Mailed on Sep. 15, 2011, 6 pages.

(Continued)

*Primary Examiner* — Ayaz Sheikh
*Assistant Examiner* — Venkatesh Haliyur
(74) *Attorney, Agent, or Firm* — Cool Patent, P.C.; Kenneth J. Cool; Joseph P. Curtin

(57) ABSTRACT

A wireless network includes base stations and mobile stations. The base stations determine burst sizes and partitions, and signal this information to the mobile stations.

23 Claims, 7 Drawing Sheets

(56) References Cited

U.S. PATENT DOCUMENTS

| | | | |
|---|---|---|---|
| 2002/0136231 A1* | 9/2002 | Leatherbury et al. | 370/442 |
| 2003/0039211 A1* | 2/2003 | Hvostov et al. | 370/230 |
| 2005/0044472 A1* | 2/2005 | Lu et al. | 714/784 |
| 2006/0184854 A1* | 8/2006 | Ihm et al. | 714/749 |
| 2006/0203766 A1* | 9/2006 | Kim et al. | 370/328 |
| 2008/0039107 A1* | 2/2008 | Ma et al. | 455/450 |
| 2008/0069019 A1* | 3/2008 | Fahldieck | 370/310 |
| 2008/0107073 A1* | 5/2008 | Hart et al. | 370/330 |
| 2008/0117996 A1* | 5/2008 | Kim et al. | 375/261 |
| 2008/0165670 A1* | 7/2008 | Tao et al. | 370/203 |
| 2008/0167075 A1* | 7/2008 | Kurtz et al. | 455/561 |
| 2008/0232319 A1* | 9/2008 | Son et al. | 370/329 |
| 2008/0298315 A1* | 12/2008 | Ihm et al. | 370/329 |
| 2008/0311902 A1* | 12/2008 | Diepstraten et al. | 455/426.1 |
| 2009/0046637 A1* | 2/2009 | Kim et al. | 370/329 |
| 2009/0073928 A1* | 3/2009 | Power et al. | 370/329 |
| 2009/0080351 A1* | 3/2009 | Ryu et al. | 370/312 |
| 2009/0086657 A1* | 4/2009 | Alpert et al. | 370/310 |
| 2009/0135950 A1* | 5/2009 | Hoffmann et al. | 375/298 |
| 2009/0141676 A1* | 6/2009 | Maheshwari et al. | 370/329 |
| 2009/0177937 A1* | 7/2009 | Lee et al. | 714/748 |
| 2009/0310477 A1* | 12/2009 | Lee et al. | 370/208 |
| 2009/0310543 A1* | 12/2009 | Kim et al. | 370/329 |
| 2010/0115124 A1* | 5/2010 | Cai et al. | 709/236 |
| 2010/0157912 A1* | 6/2010 | Chin | 370/329 |
| 2010/0189050 A1* | 7/2010 | Beems Hart et al. | 370/329 |
| 2010/0195546 A1* | 8/2010 | Chun et al. | 370/281 |
| 2010/0214992 A1* | 8/2010 | Hart et al. | 370/329 |
| 2010/0226329 A1* | 9/2010 | Harel et al. | 370/329 |
| 2010/0313098 A1* | 12/2010 | Lee et al. | 714/752 |
| 2011/0261778 A1* | 10/2011 | Caretti et al. | 370/329 |

OTHER PUBLICATIONS

International Search Report and Written opinion received from PCT Application No. PCT/US2010/026015, mailed on Oct. 19, 2010, 9 pages.

Office Action Received for Japanese Patent Application No. 2011-551325, Mailed on Jun. 12, 2012, 3 pages of Office Action and 3 pages of English Translation.

Harel et al., "Proposal for 802.16m amendment text on burst size signaling", Mar. 2, 2009, 8 Pages. available at: http://grouper.ieee.org/groups/802/16/tgm//contrib/C80216m-09_0497.doc.

\* cited by examiner

BURST SIZE SIGNALING AND PARTITION RULE

RELATED APPLICATIONS

Benefit is claimed under 35 U.S.C. 119(e) to U.S. Provisional Application Ser. No. 61/156,882, entitled "Advanced Wireless Communication Systems and Techniques" by Zhu et al., filed Mar. 3, 2009, which is incorporated herein in its entirety by reference for all purposes.

FIELD

The present invention relates generally to wireless networks, and more specifically to signaling burst sizes in wireless networks.

BACKGROUND

A family of standards has been developed by the Institute of Electrical and Electronic Engineers (IEEE) to provide for fixed, portable, and/or mobile broadband wireless access networks (for example, the IEEE std. 802.16e, published 2005).

In some current systems, certain information is typically "signaled" from a base station to a mobile station so that the mobile station can properly encode (in the case of uploads) and decode (in the case of downloads) bursts of data. The signaling method used in current IEEE 802.16e compatible systems is referred to as MCS (modulation and coding scheme).

MCS signaling means that there are a small number of pairs of code-rate (R) and modulation order (M), and the signaling selects one of them. Knowing the allocation size in terms of number of quadrature amplitude modulation (QAM) symbols, the burst size is computed as: $N_{QamSymbols} \cdot R \cdot M$ for the selected pair (R, M).

One problem with MCS signaling is that the set of possible burst sizes depends on allocation size. For example, in IEEE 802.16e, a burst size of 45 bytes is possible only if five slots are allocated. This makes it difficult to avoid padding in bursts which results in wasted bandwidth. For example, for large burst sizes, padding may be avoided by fragmentation or concatenation of physical layer data units (PDUs); however, this requires the media access control (MAC) layer to be aware of momentary scheduling and link adaptation decisions, which make it a difficult problem. Also, for example, for small burst sizes, or latency-limited applications (VoIP, gaming), the PDU size actually comes from higher layers and padding is inevitable.

DESCRIPTION OF EMBODIMENTS

Figure 1:
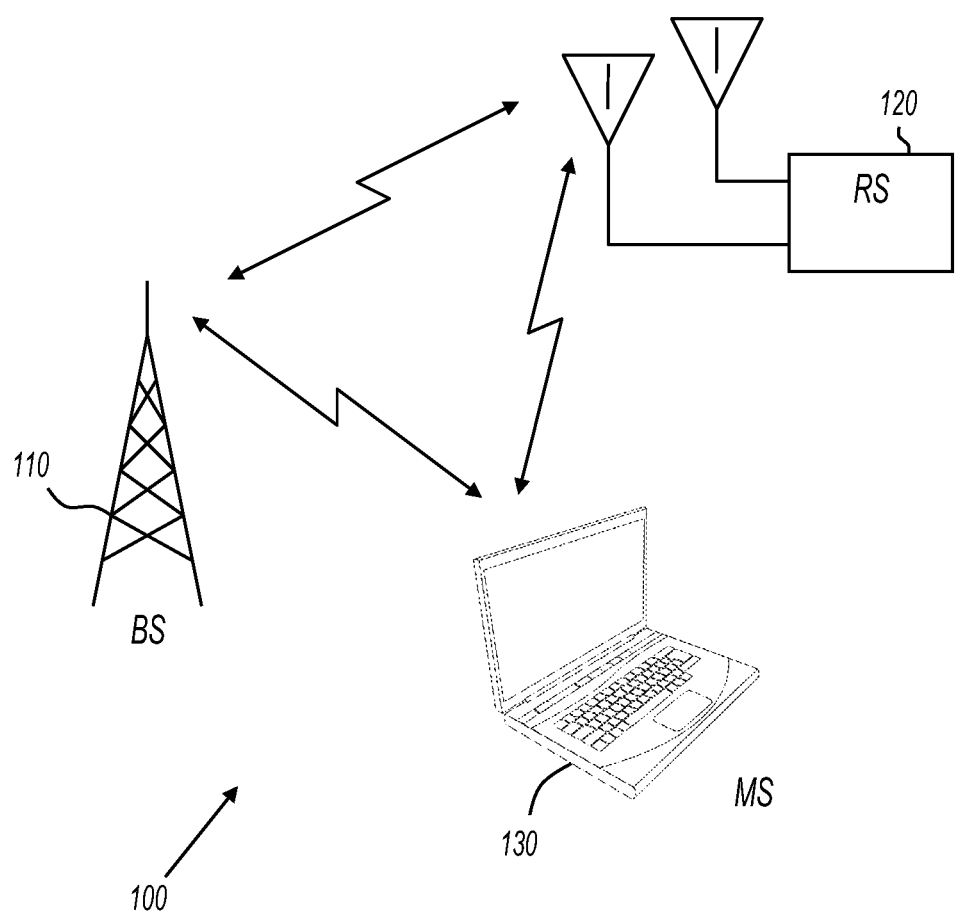
FIG. 1 shows stations in a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows stations in a wireless network. Wireless network 100 is shown including base station (BS) 110, relay station (RS) 120, and mobile station (MS) 130. Station 130 is shown in FIG. 1 as a laptop computer, but this is not a limitation of the present invention. For example, station 130 may or may not be a computer, and may or may not be mobile. Although only three stations are shown in FIG. 1, any number of stations may be present without departing from the scope of the present invention.

Stations 110, 120, and 130 may include any number of antennas. In the example of FIG. 1, station 120 includes two antennas, and the number of antennas at stations 110 and 130 is not explicitly shown. The "channel" through which the stations communicate may include many possible signal paths. For example, when stations 110, 120, and 130 are in an environment with many "reflectors" (e.g. walls, doors, or other obstructions), many signals may arrive from different paths. This condition is known as "multipath." In some embodiments, stations 110, 120, and 130 are multiple-input-multiple-output (MIMO) systems that take advantage of multiple antennas and multipath and to increase the communications bandwidth. Further, the multipath may be advantageously used to reject interfering signals.

Many of the embodiments described herein use terminology common in IEEE 802.16 standards. For example, much of the terminology is borrowed from IEEE 802.16m, which at the time of this writing is still a work in progress. Some embodiments of the present invention may be utilized in IEEE 802.16m systems; however, this is not a limitation of the present invention. The various embodiments of the present invention may be utilized in any communications system.

IEEE 802.16m systems are currently proposed to include "MAP" information elements (IEs) within subframes. The MAP IEs come in many different forms including download (DL) MAP IEs, upload (UL) MAP IEs, and many others. In some embodiments, the DL MAP IEs and UL MAP IEs are used to signal burst sizes as well as other parameters to other stations. For example, base station 110 provides signaling of burst sizes, modulation order, and various other parameters to relay station 120 and mobile station 130.

Burst Size and Modulation Order Signaling

Option 1

Various embodiments within option 1 include a fixed and relatively small table of possible burst sizes. These burst sizes are shown in Table 1 below.

TABLE 1

Burst Sizes and Segmentation Rule

| idx | Size (bytes) | Segmentation Rule |
|---|---|---|
| 1 | 6 | — |
| 2 | 8 | — |
| 3 | 9 | — |
| 4 | 10 | — |
| 5 | 11 | — |
| 6 | 12 | — |
| 7 | 13 | — |
| 8 | 15 | — |
| 9 | 17 | — |
| 10 | 19 | — |
| 11 | 22 | — |
| 12 | 25 | — |
| 13 | 27 | — |
| 14 | 31 | — |
| 15 | 36 | — |
| 16 | 40 | — |
| 17 | 44 | — |
| 18 | 50 | — |
| 19 | 57 | — |
| 20 | 64 | — |
| 21 | 71 | — |
| 22 | 80 | — |
| 23 | 90 | — |
| 24 | 100 | — |
| 25 | 114 | — |
| 26 | 128 | — |
| 27 | 145 | — |
| 28 | 164 | — |
| 29 | 181 | — |
| 30 | 205 | — |
| 31 | 233 | — |
| 32 | 262 | — |
| 33 | 291 | — |
| 34 | 328 | — |
| 35 | 368 | — |
| 36 | 416 | — |
| 37 | 472 | — |
| 38 | 528 | — |
| 39 | 600 | — |
| 40 | 656 | 2 × 328 |
| 41 | 736 | 2 × 368 |
| 42 | 832 | 2 × 416 |
| 43 | 944 | 2 × 472 |
| 44 | 1056 | 2 × 528 |
| 45 | 1200 | 2 × 600 |
| 46 | 1416 | 3 × 472 |
| 47 | 1584 | 3 × 528 |
| 48 | 1800 | 3 × 600 |
| 49 | 1888 | 4 × 472 |
| 50 | 2112 | 4 × 528 |
| 51 | 2400 | 4 × 600 |
| 52 | 2640 | 5 × 528 |
| 53 | 3000 | 5 × 600 |
| 54 | 3600 | 6 × 600 |
| 55 | 4200 | 7 × 600 |
| 56 | 4800 | 8 × 600 |
| 57 | 5400 | 9 × 600 |
| 58 | 6000 | 10 × 600 |
| 59 | 6600 | 11 × 600 |
| 60 | 7200 | 12 × 600 |
| 61 | 7800 | 13 × 600 |
| 62 | 8400 | 14 × 600 |
| 63 | 9600 | 16 × 600 |
| 64 | 10800 | 18 × 600 |
| 65 | 12000 | 20 × 600 |
| 66 | 14400 | 24 × 600 |

Each entry in Table 1 has a unique index (idx), a unique burst size, and a unique partition (segmentation) rule. For a specific burst signaled in the MAP, the burst size is determined as follows: 1) the number of allocated logical resource units (LRUs) chooses an offset into this table; and 2) an additional five bits define the location in the table with respect to this offset.

Only the burst sizes listed in Error! Reference source not found. are supported in PHY layer. These sizes include the addition of cyclic redundancy check (CRC) per burst and per forward error correction (FEC) block when applicable. Other sizes require padding to the next burst size. Table 1 provides a fixed set of burst sizes independent of allocation size, and also compresses the burst size information by utilizing the relation between burst size and allocation size (as in MCS signaling).

Properties of the proposed table include: 1) only 39 different FEC block sizes between 6 bytes and 600 bytes; 2) all burst sizes that are larger than 600 bytes are segmented to FEC blocks of one size, so the segmentation (/concatenation) rule is the simplest possible and maximal coding gain is achieved.

The table was constructed by using approximately exponential growth of the sizes, similar to the behavior of MCS signaling when the allocation becomes larger. Each size is about 12% larger than the one before it.

Burst Size Signaling

Using a minimal and maximal code rate for a transmission, the set of possible burst sizes, given a specific allocation size, is only a subset of the sizes in Error! Reference source not found. Therefore, burst size can be signaled by less than 7 bits needed to index this table.

The base station transmits multiple MAP IEs in the signaling process. The base station transmits one MAP IE that includes the number of allocated LRUs, and another MAP IE that describes a burst using a five-bit burst size parameter $I_{SIZEOFFSET} \in \{0, 1, \ldots, 31\}$. The mobile station can determine the allocation size, in terms of number of LRUs multiplied by the MIMO rate that are allocated for the burst. For example, the size of an allocation of two LRUs with four streams spatial multiplexing is 2*4=8. The base station calculates the parameter $I_{MINIMALSIZE}$ according to Table 1 ($I_{MINIMALSIZE}$=Min index). The burst size index for use in Table 1 is then calculated as:

$$idx = I_{MINIMALSIZE} + I_{SIZEOFFSET} \quad (1)$$

TABLE 2

| Alloc. size | Min index |
|---|---|
| 1 | 1 |
| 2 | 1 |
| 3 | 1 |
| 4 | 2 |
| 5 | 4 |
| 6 | 6 |
| 7 | 8 |
| 8 | 9 |
| 9 | 10 |
| 10 | 11 |
| 11 | 11 |
| 12 | 12 |
| 13 | 13 |
| 14 | 14 |
| 15 | 14 |
| 16 | 15 |
| 17 | 15 |
| 18 | 15 |
| 19 | 16 |
| 20 | 16 |
| 21 | 17 |
| 22 | 17 |
| 23 | 18 |
| 24 | 18 |
| 25 | 18 |
| 26 | 19 |
| 27 | 19 |

TABLE 2-continued

| Alloc. size | Min index |
|---|---|
| 28 | 19 |
| 29 | 20 |
| 30 | 20 |
| 31 | 20 |
| 32 | 20 |
| 33 | 21 |
| 34 | 21 |
| 35 | 21 |
| 36 | 22 |
| 37 | 22 |
| 38 | 22 |
| 39 | 22 |
| 40 | 22 |
| 41 | 23 |
| 42 | 23 |
| 43 | 23 |
| 44 | 23 |
| 45 | 23 |
| 46 | 24 |
| 47 | 24 |
| 48 | 24 |
| 49 | 24 |
| 50 | 24 |
| 51 | 25 |
| 52 | 25 |
| 53 | 25 |
| 54 | 25 |
| 55 | 25 |
| 56 | 25 |
| 57 | 25 |
| 58 | 26 |
| 59 | 26 |
| 60 | 26 |
| 61 | 26 |
| 62 | 26 |
| 63 | 26 |
| 64 | 26 |
| 65 | 27 |
| 66 | 27 |
| 67 | 27 |
| 68 | 27 |
| 69 | 27 |
| 70 | 27 |
| 71 | 27 |
| 72 | 27 |
| 73 | 28 |
| 74 | 28 |
| 75 | 28 |
| 76 | 28 |
| 77 | 28 |
| 78 | 28 |
| 79 | 28 |
| 80 | 28 |
| 81 | 28 |
| 82 | 28 |
| 83 | 29 |
| 84 | 29 |
| 85 | 29 |
| 86 | 29 |
| 87 | 29 |
| 88 | 29 |
| 89 | 29 |
| 90 | 29 |
| 91 | 30 |
| 92 | 30 |
| 93 | 30 |
| 94 | 30 |
| 95 | 30 |
| 96 | 30 |
| 97 | 30 |
| 98 | 30 |
| 99 | 30 |
| 100 | 30 |
| 101 | 30 |
| 102 | 30 |
| 103 | 31 |
| 104 | 31 |
| 105 | 31 |
| 106 | 31 |
| 107 | 31 |
| 108 | 31 |
| 109 | 31 |
| 110 | 31 |
| 111 | 31 |
| 112 | 31 |
| 113 | 31 |
| 114 | 31 |
| 115 | 31 |
| 116 | 31 |
| 117 | 32 |
| 118 | 32 |
| 119 | 32 |
| 120 | 32 |
| 121 | 32 |
| 122 | 32 |
| 123 | 32 |
| 124 | 32 |
| 125 | 32 |
| 126 | 32 |
| 127 | 32 |
| 128 | 32 |
| 129 | 32 |
| 130 | 32 |
| 131 | 32 |
| 132 | 33 |
| 133 | 33 |
| 134 | 33 |
| 135 | 33 |
| 136 | 33 |
| 137 | 33 |
| 138 | 33 |
| 139 | 33 |
| 140 | 33 |
| 141 | 33 |
| 142 | 33 |
| 143 | 33 |
| 144 | 33 |
| 145 | 33 |
| 146 | 34 |
| 147 | 34 |
| 148 | 34 |
| 149 | 34 |
| 150 | 34 |
| 151 | 34 |
| 152 | 34 |
| 153 | 34 |
| 154 | 34 |
| 155 | 34 |
| 156 | 34 |
| 157 | 34 |
| 158 | 34 |
| 159 | 34 |
| 160 | 34 |
| 161 | 34 |
| 162 | 34 |
| 163 | 34 |
| 164 | 34 |
| 165 | 35 |
| 166 | 35 |
| 167 | 35 |
| 168 | 35 |
| 169 | 35 |
| 170 | 35 |
| 171 | 35 |
| 172 | 35 |
| 173 | 35 |
| 174 | 35 |
| 175 | 35 |
| 176 | 35 |
| 177 | 35 |
| 178 | 35 |
| 179 | 35 |
| 180 | 35 |
| 181 | 35 |

TABLE 2-continued

| Alloc. size | Min index |
|---|---|
| 182 | 35 |
| 183 | 35 |
| 184 | 35 |
| 185 | 36 |
| 186 | 36 |
| 187 | 36 |
| 188 | 36 |
| 189 | 36 |
| 190 | 36 |
| 191 | 36 |
| 192 | 36 |

Tables 1 and 2 assume LRU nominal size of 18×6 tones including pilots. Small changes in LRU size do not require any change. Various embodiments include different tables defined to support significantly different LRU sizes if needed.

The burst size signaling using Error! Reference source not found, Table 1, and Equation 1, has the following properties. Minimal spectral efficiency for each allocation size (except 1 or 2 LRUs, in which minimal spectral efficiency is the result of the minimal burst (/FEC block) size) is at most 0.168, or equivalently the minimal code rate for QPSK is ≤1/12.5 (this was the design principle for construction of Table 1). Spectral efficiency here includes the modulation order, code-rate (ratio between information size and number of coded bits transmuted) and pilot overhead. Maximal spectral efficiency for each allocation size is least 5.36, or equivalently the maximal code rate for 64-QAM is ≥8/9.

Between the minimal and maximal spectral efficiency (with code rate ≤1) there are 31 different sizes, which allow minimizing of the padding. The burst size resolution for small bursts is 1 byte and is larger for larger bursts. The table is a function of the allocation size in LRUs rather than the actual number of subcarriers which may vary (due to MIMO, number of pilots, etc). This is done for simplicity. All of the burst sizes in the table, which are within the range of minimal and maximal spectral efficiency, are possible. This is in contrast to the case of MCS signaling, in which different set burst sizes is supported for each allocation size. This enables better separation between PHY and MAC operation.

Rule for Modulation Order

The modulation order M (2 for QPSK, 4 for 16-QAM and 6 for 64-QAM) depends on the parameter $I_{SIZEOFFSET}$ according to the rule set forth in Error! Reference source not found. Allocation size of 1 or 2 LRUs are special cases (separate columns in the table). For allocation of at least 3 LRUs the modulation order depends only on $I_{SIZEOFFSET}$.

TABLE 3

Modulation Order

| $I_{SizeOffset}$ | M (allocation size ≥ 3) | M (allocation size = 2) | M (allocation size = 1) |
|---|---|---|---|
| 0 | 2 | 2 | 2 |
| 1 | 2 | 2 | 2 |
| 2 | 2 | 2 | 2 |
| 3 | 2 | 2 | 2 |
| 4 | 2 | 2 | 2 |
| 5 | 2 | 2 | 2 |
| 6 | 2 | 2 | 2 |
| 7 | 2 | 2 | 2 |
| 8 | 2 | 2 | 2 |
| 9 | 2 | 2 | 2 |
| 10 | 2 | 2 | 4 |
| 11 | 2 | 2 | 4 |
| 12 | 2 | 2 | 4 |
| 13 | 2 | 2 | 4 |
| 14 | 2 | 2 | 4 |
| 15 | 2 | 2 | 4 |
| 16 | 2 | 4 | 6 |
| 17 | 2 | 4 | 6 |
| 18 | 2 | 4 | 6 |
| 19 | 4 | 4 | 6 |
| 20 | 4 | 4 | 6 |
| 21 | 4 | 4 | 6 |
| 22 | 4 | 6 | 6 |
| 23 | 4 | 6 | 6 |
| 24 | 6 | 6 | 6 |
| 25 | 6 | 6 | 6 |
| 26 | 6 | 6 | 6 |
| 27 | 6 | 6 | 6 |
| 28 | 6 | 6 | 6 |
| 29 | 6 | 6 | 6 |
| 30 | 6 | 6 | 6 |
| 31 | 6 | 6 | 6 |

Error! Reference source not found. was constructed based on the rule for modulation order as function of spectral efficiency (applied only approximately) set forth below in Table 4.

TABLE 4

| Modulation order design principle | |
|---|---|
| Spectral efficiency | Modulation order |
| 0 ≤ SE ≤ 1.5 | 2 |
| 1.5 < SE ≤ 3 | 4 |
| 3 < SE | 6 |

In some embodiments, the burst size signaling allows the allocation size to be changed while the burst size remains un-changed in adaptive Hybrid Automatic Repeat reQuest (HARQ) re-transmissions. Burst size signaling allows flexible changes to the allocation size, while not relying on successful reception of the MAP IE of the first transmission.

Further, in some embodiments, the burst size signaling allows a common burst size in different data links having different allocation sizes. For example, a relay station may benefit from burst size signaling in which the same data burst should be transferred in the data link between BS and RS and between RS and MS. Since these radio links may have different conditions it is desirable to transmit the same burst size with different allocation size.

Figure 2:
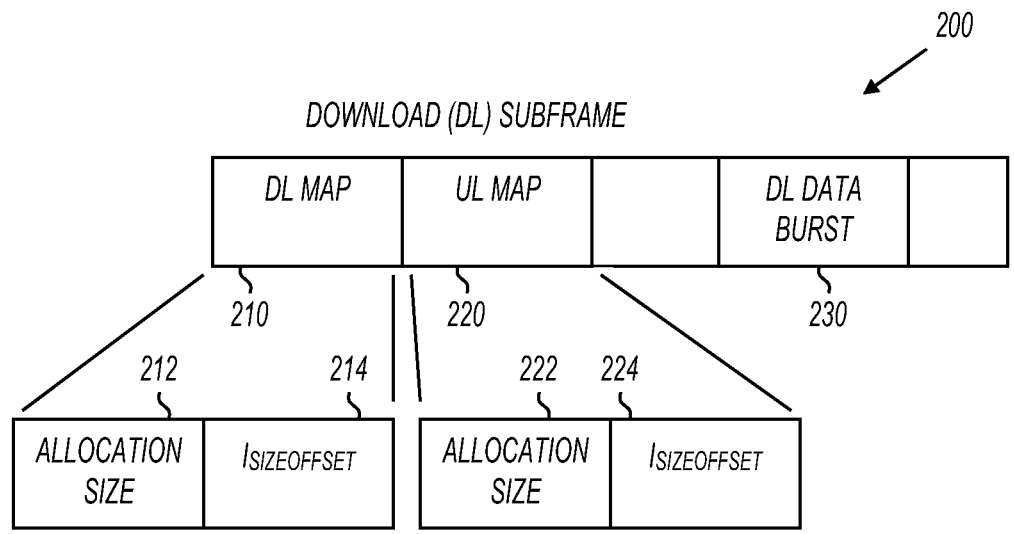
FIG. 2 shows a download subframe in a wireless network.

FIG. 2 shows a download subframe in a wireless network. Download subframe 200 includes a DL MAP 210, an UL MAP 220, and a DL data burst 230. DL MAP 210 is shown including information elements (IEs) 212 and 214. UL MAP 220 is shown including IEs 222 and 224.

DL MAP IE 212 includes data indicative of an allocation size for a download burst partition. For example, in some embodiments, DL MAP IE 212 includes a number of LRUs allocated for a download burst. DL MAP IE 214 includes a five-bit parameter $I_{SIZEOFFSET}$. In operation, a base station determines the values with which to populate DL MAP IEs 212 and 214 prior to transmitting the subframe to a mobile station. The mobile station upon receiving DL MAP IEs 212 and 214 can then determine the download burst size and partition rule using equation 1 and Tables 1 and 2. The DL data burst 230 is transmitted in accordance with the burst size and partition rule.

Figure 3:
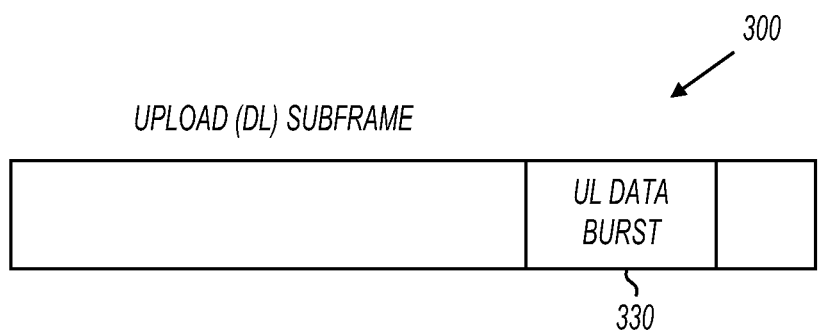
FIG. 3 shows an upload subframe in a wireless network.

UL MAP IE 222 includes data indicative of an allocation size for an upload burst partition. For example, in some embodiments, UL MAP IE 222 includes a number of LRUs allocated for an upload burst. UL MAP IE 224 includes a five-bit parameter $I_{SIZEOFFSET}$. In operation, a base station determines the values with which to populate UL MAP IEs 222 and 224 prior to transmitting the subframe to a mobile station. The mobile station upon receiving UL MAP IEs 222 and 224 can then determine upload burst sizes and partitions using equation 1 and Tables 1 and 2. The mobile station then transmits UL data burst 330 in upload subframe 300 as shown in FIG. 3.

FIGS. 4-7 show flowcharts in accordance with various embodiments of the present invention. In some embodiments, these methods may be used in, or for, a wireless system that signals burst sizes for uploads and downloads between base stations and mobile stations. In some embodiments, the methods, or portions thereof, are performed by a wireless communications device (e.g., a base station, relay station, or mobile station), embodiments of which are shown in the various figures. In other embodiments, the methods are performed by a processor or electronic system. The methods are not limited by the particular type of apparatus or software element performing the method. The various actions in the methods may be performed in the order presented, or may be performed in a different order. Further, in some embodiments, some actions listed are omitted from the methods.

Figure 4:
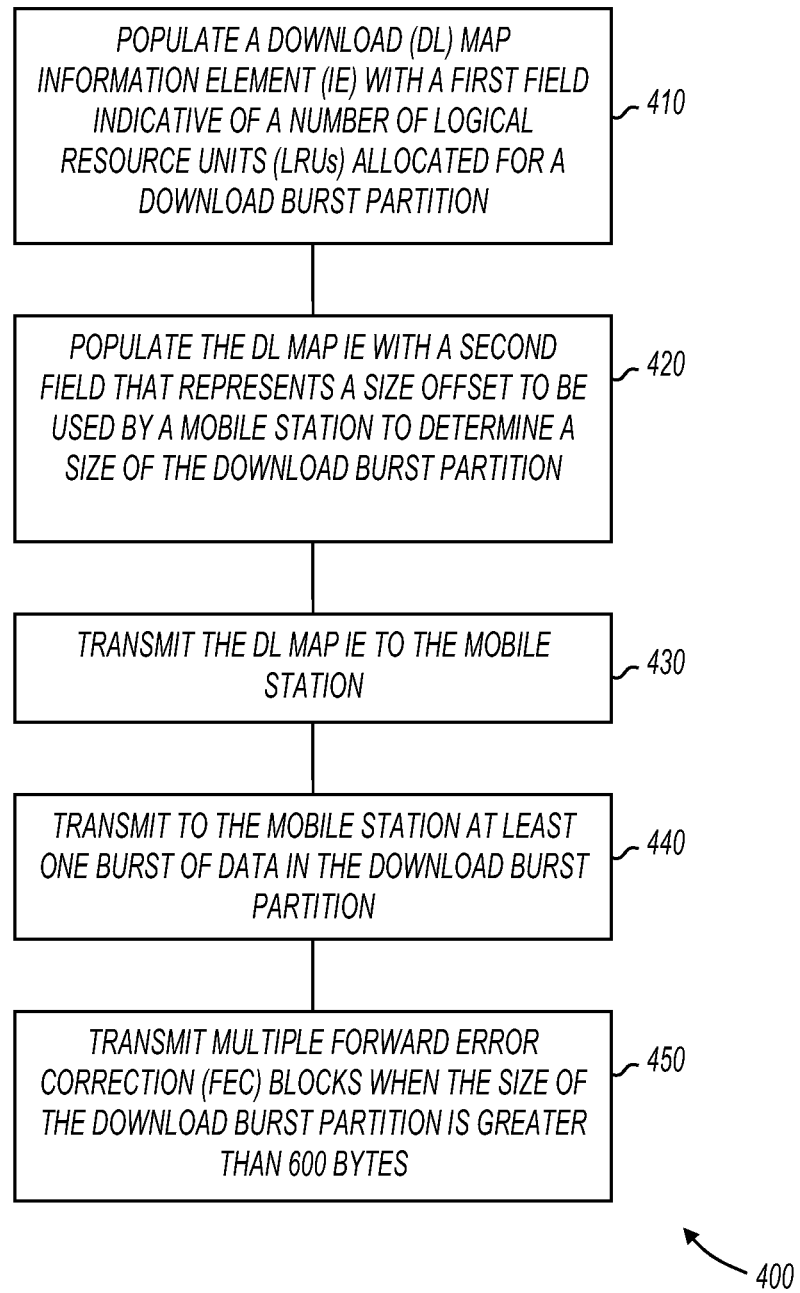
FIGS. 4-7 show flowcharts in accordance with various embodiments of the present invention.

Referring now to FIG. 4, method 400 is shown beginning at block 410 in which a download (DL) MAP information element (IE) is populated with a first field indicative of a number of logical resource units (LRUs) allocated for a download burst partition. This corresponds to a base station populating DL MAP IE 212 as shown in FIG. 2.

At 420, a DL MAP IE is populated with a second field that represents a size offset to be used by a mobile station to determine a size of the download burst partition. This corresponds to a mobile station populating DL MAP IE 214 with $I_{SIZEOFFSET}$ as shown in FIG. 2. In some embodiments, $I_{SIZEOFFSET}$ is a five-bit value.

At 430, the DL MAP IEs are transmitted to the mobile station. This occurs when the subframe that includes the DL MAP is transmitted by the base station. At 440, at least one burst of data is transmitted from the base station to a mobile station in the download burst partition. The burst of data may include one or more FEC blocks depending on the size of the burst partition as shown above in Table 1. Accordingly, as described at 450, multiple FEC blocks are transmitted when the size of the download burst partition is greater than 600 bytes.

Figure 5:
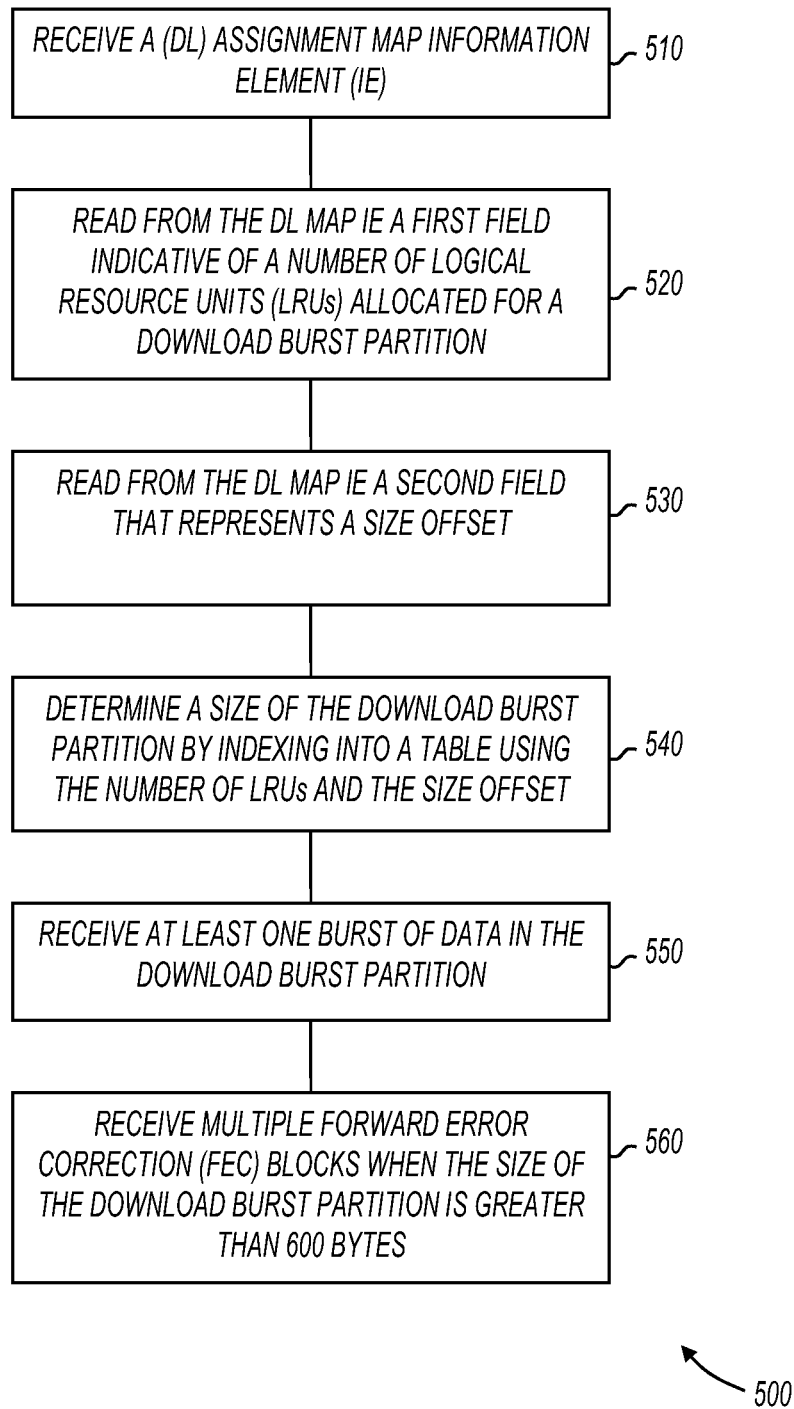

Referring now to FIG. 5, method 500 show an example method performed by a mobile station after receiving the DL MAP and DL burst partition transmitted in method 400 (FIG. 4). Method 500 begins at 510 in which a DL MAP IE is received. This includes the DL MAP IEs populated in method 400. At 520, a first field indicative of a number of LRUs allocated for a download burst partition is read from the DL MAP. At 530, a second field that represents a size offset $I_{SIZEOFFSET}$ is read from the DL MAP.

At 540, a size of the download burst partition is determined by indexing into a table using the number of LRUs and the size offset. This correspond to the use of equation 1 and Tables 1 and 2 as described above.

At 550, at least one burst of data is received at the mobile station from the base station in the download burst partition. The burst of data may include one or more FEC blocks depending on the size of the burst partition as shown above in Table 1. Accordingly, as described at 560, multiple FEC blocks are received when the size of the download burst partition is greater than 600 bytes.

Figure 6:
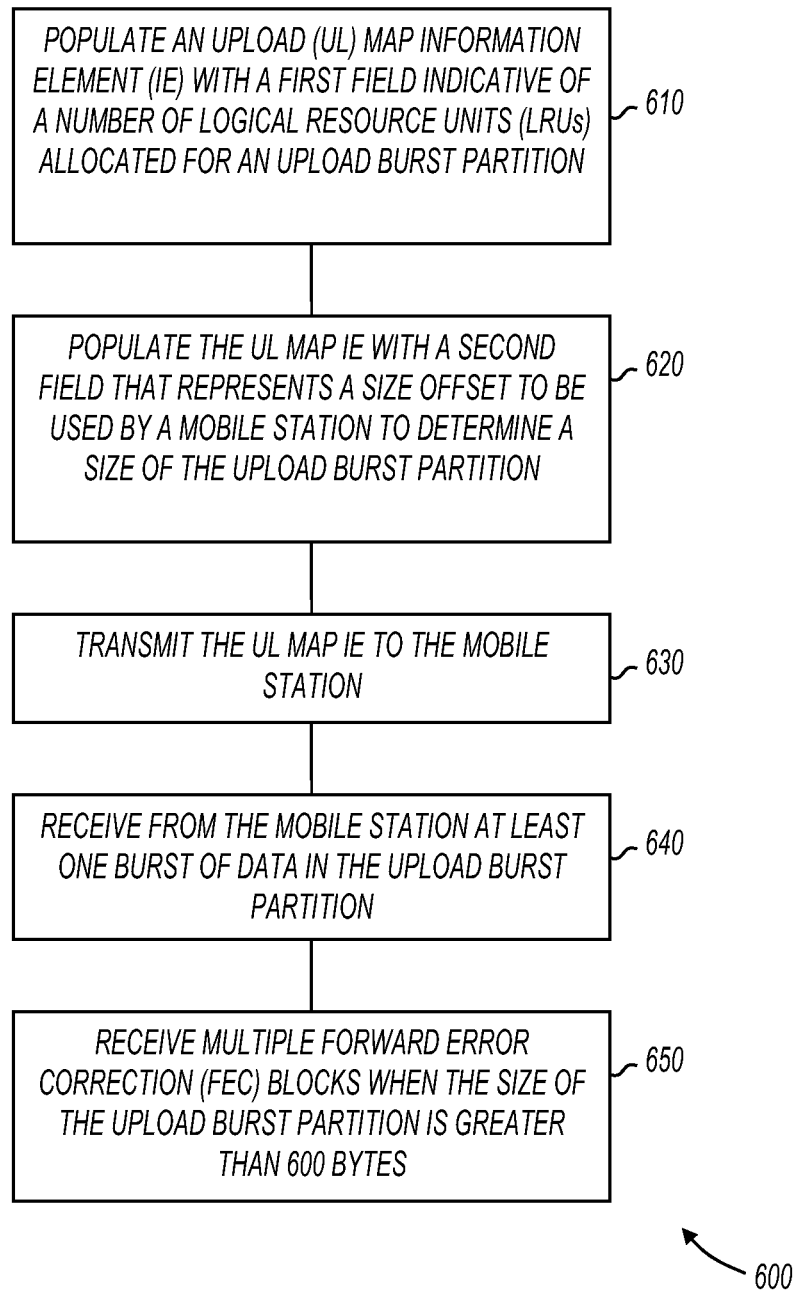

Referring now to FIG. 6, method 600 is shown beginning at block 610 in which an upload (UL) MAP information element (IE) is populated with a first field indicative of a number of logical resource units (LRUs) allocated for an upload burst partition. This corresponds to a base station populating UL MAP IE 222 as shown in FIG. 2.

At 620, an UL, MAP IE is populated with a second field that represents a size offset to be used by a mobile station to determine a size of the upload burst partition. This corresponds to a mobile station populating UL MAP IE 224 with $I_{SIZEOFFSET}$ as shown in FIG. 2. In some embodiments, $I_{SIZEOFFSET}$ is a five-bit value.

At 630, the UL MAP IEs are transmitted to the mobile station. This occurs when the subframe that includes the UL MAP is transmitted by the base station. At 640, at least one burst of data is received at the base station from a mobile station in the upload burst partition. The burst of data may include one or more FEC blocks depending on the size of the burst partition as shown above in Table 1. Accordingly, as described at 650, multiple FEC blocks are received when the size of the download burst partition is greater than 600 bytes.

Figure 7:
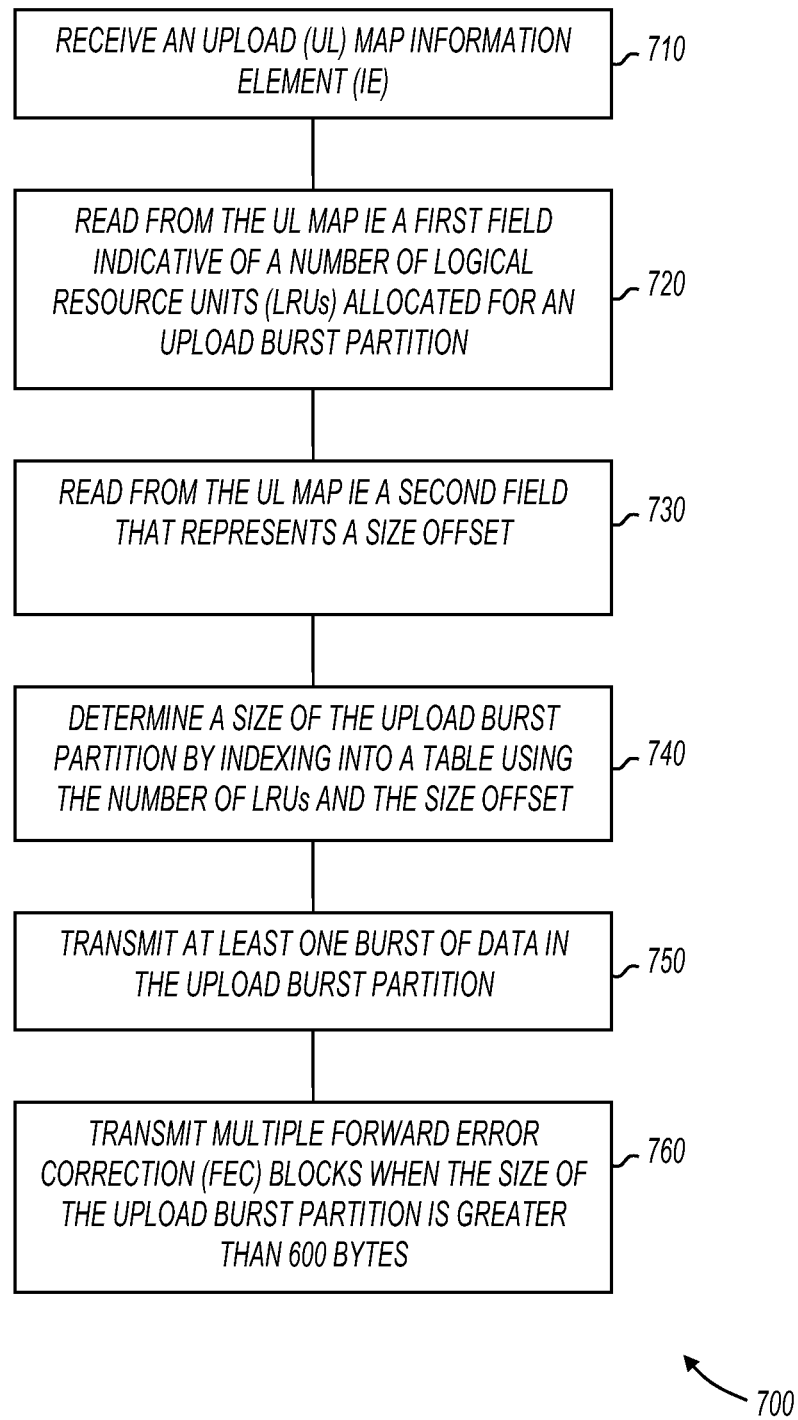

Referring now to FIG. 7, method 700 shows an example method performed by a mobile station after receiving the UL MAP transmitted in method 600 (FIG. 6). Method 700 begins at 710 in which an UL MAP IE is received. This includes the UL MAP IEs populated in method 600. At 720, a first field indicative of a number of LRUs allocated for an upload burst partition is read from the UL MAP. At 730, a second field that represents a size offset $I_{SIZEOFFSET}$ is read from the UL MAP.

At 740, a size of the upload burst partition is determined by indexing into a table using the number of LRUs and the size offset. This correspond to the use of equation 1 and Tables 1 and 2 as described above.

At 750, at least one burst of data is transmitted from the mobile station to the base station in the upload burst partition. The burst of data may include one or more FEC blocks depending on the size of the burst partition as shown above in Table 1. Accordingly, as described at 760, multiple FEC blocks are transmitted when the size of the upload burst partition is greater than 600 bytes.

Burst Size Signaling and Partition Rule

Option 2

This contribution discusses the signaling of burst size and the modulation order, assuming the allocation size is already known. Our proposal is composed of the following components: MBI table construction, burst size table construction, burst partition rule, and burst size detection. The concept is that we would like to have a fixed table of burst sizes independent of allocation size, and at the same time we would like to compress the burst size information by utilizing the relation between burst size and allocation size. In addition, the burst size is designed as multiple of one possible FEC block size to void any padding for burst partition.

MBI Table Construction

In MBI table, there are three parameters including modulation order, burst size indicator and SE. Burst size indicator and SE will be used for constructing the burst size table. The number MBI index may have 16, 32 or 64 levels, Only 32 levels are considered here. The SE level is obtained by LLS simulation under AWGN channel. The 30 levels of SE are equally spaced along the SNR axis.

TABLE 1

MBI for downlink and uplink data channel
MBI index Modulation Burst size indicator SE

| MBI index | Modulation | Burst size indicator | SE |
|---|---|---|---|
| 0 | QPSK | 0 | 0.172 |
| 1 | QPSK | 1 | 0.211 |
| 2 | QPSK | 2 | 0.2422 |
| 3 | QPSK | 3 | 0.3046 |
| 4 | QPSK | 4 | 0.375 |
| 5 | QPSK | 5 | 0.4532 |
| 6 | QPSK | 6 | 0.5468 |
| 7 | QPSK | 7 | 0.6954 |
| 8 | QPSK | 8 | 0.8126 |
| 9 | QPSK | 9 | 0.9454 |
| 10 | QPSK | 10 | 1.0704 |
| 11 | QPSK | 11 | 1.1718 |
| 12 | QPSK | 12 | 1.3908 |
| 13 | 16QAM | 12 | 1.3908 |
| 14 | 16QAM | 13 | 1.6252 |
| 15 | 16QAM | 14 | 1.7656 |
| 16 | 16QAM | 15 | 2 |
| 17 | 16QAM | 16 | 2.2188 |
| 18 | 16QAM | 17 | 2.4064 |
| 19 | 16QAM | 18 | 2.7188 |
| 20 | 16QAM | 19 | 2.8592 |
| 21 | 16QAM | 20 | 3.0156 |
| 22 | 16QAM | 21 | 3.3048 |
| 23 | 64QAM | 21 | 3.3048 |
| 24 | 64QAM | 22 | 3.5388 |
| 25 | 64QAM | 23 | 3.8436 |
| 26 | 64QAM | 24 | 4.1484 |
| 27 | 64QAM | 25 | 4.3596 |
| 28 | 64QAM | 26 | 4.5234 |
| 29 | 64QAM | 27 | 4.8282 |
| 30 | 64QAM | 28 | 5.133 |
| 31 | 64QAM | 29 | 5.4138 |

Burst Size Table

The burst size table can be generated by the following steps.

1. Using parameter SE in MBI table to calculate target burst size for each LRU. The size of each LRU is 12 bytes for size of 18 subcarriers by 6 OFDM symbols. For other irregular sizes of LRU, it can be converted to equivalent number of 12 bytes LRU. The number of LRU is from 1 to 96 for supporting bandwidth 5M, 10M, and 20M. For MIMO case, the burst size will be the product of proposed burst size in table 3 and MIMO order.

2. When target burst size is equal or less than 600 byte, the same FEC block size in table 2 will be selected as final burst size. If there is no same FEC block size, the closest one will be selected as final burst size.

3. When target burst size is larger than 600 byte, burst partition is needed. Assume target burst size is N, the target FEC block size is round(N/ceil(N/600)). If there is a same FEC block size as target FEC block size, the burst size will be still N. If there is no such FEC block size and the closest one is K, the burst size will be ceil(N/600)*K.

4. The burst size in the table includes burst CRC bits.

Burst Partition Rule

Suppose the burst size including burst CRC is M. The number of FEC block will be ceil(M/600) and FEC block size is M/ceil(M/600).

Burst Size Detection

The MBI index and size of allocation are signaled in the MAP. The burst size can be easily determined by table 3 using burst size indicator and number of LRUs.

TABLE 2

FEC block size (including FEC block CRC) table in bytes

| Index $B_i$ | $N_{FB}$ |
|---|---|
| 0 | 6 |
| 1 | 8 |
| 2 | 9 |
| 3 | 10 |
| 4 | 11 |
| 5 | 12 |
| 6 | 13 |
| 7 | 15 |
| 8 | 16 |
| 9 | 17 |
| 10 | 18 |
| 11 | 19 |
| 12 | 20 |
| 13 | 22 |
| 14 | 23 |
| 15 | 24 |
| 16 | 25 |
| 17 | 26 |
| 18 | 27 |
| 19 | 29 |
| 20 | 30 |
| 21 | 31 |
| 22 | 32 |
| 23 | 33 |
| 24 | 34 |
| 25 | 36 |
| 26 | 37 |
| 27 | 38 |
| 28 | 39 |
| 29 | 40 |
| 30 | 41 |
| 31 | 43 |
| 32 | 44 |
| 33 | 45 |
| 34 | 46 |
| 35 | 47 |
| 36 | 48 |
| 37 | 50 |
| 38 | 52 |
| 39 | 54 |
| 40 | 55 |
| 41 | 57 |
| 42 | 59 |
| 43 | 60 |
| 44 | 62 |
| 45 | 64 |
| 46 | 66 |
| 47 | 68 |
| 48 | 69 |
| 49 | 71 |
| 50 | 73 |
| 51 | 75 |
| 52 | 76 |
| 53 | 78 |
| 54 | 80 |
| 55 | 82 |
| 56 | 83 |
| 57 | 85 |
| 58 | 87 |
| 59 | 89 |
| 60 | 90 |
| 61 | 92 |
| 62 | 94 |
| 63 | 96 |
| 64 | 97 |
| 65 | 100 |
| 66 | 103 |
| 67 | 106 |
| 68 | 109 |
| 69 | 111 |
| 70 | 114 |
| 71 | 117 |
| 72 | 120 |
| 73 | 123 |

TABLE 2-continued

FEC block size (including FEC block CRC) table in bytes

| Index $B_i$ | $N_{FB}$ |
|---|---|
| 74 | 125 |
| 75 | 128 |
| 76 | 131 |
| 77 | 134 |
| 78 | 137 |
| 79 | 139 |
| 80 | 142 |
| 81 | 145 |
| 82 | 148 |
| 83 | 152 |
| 84 | 156 |
| 85 | 160 |
| 86 | 164 |
| 87 | 167 |
| 88 | 171 |
| 89 | 174 |
| 90 | 178 |
| 91 | 181 |
| 92 | 185 |
| 93 | 188 |
| 94 | 192 |
| 95 | 195 |
| 96 | 200 |
| 97 | 205 |
| 98 | 209 |
| 99 | 214 |
| 100 | 219 |
| 101 | 223 |
| 102 | 228 |
| 103 | 233 |
| 104 | 237 |
| 105 | 240 |
| 106 | 244 |
| 107 | 250 |
| 108 | 256 |
| 109 | 262 |
| 110 | 268 |
| 111 | 274 |
| 112 | 279 |
| 113 | 285 |
| 114 | 291 |
| 115 | 296 |
| 116 | 304 |
| 117 | 312 |
| 118 | 320 |
| 119 | 328 |
| 120 | 344 |
| 121 | 352 |
| 122 | 360 |
| 123 | 368 |
| 124 | 376 |
| 125 | 384 |
| 126 | 400 |
| 127 | 408 |
| 128 | 416 |
| 129 | 424 |
| 130 | 432 |
| 131 | 440 |
| 132 | 456 |
| 133 | 464 |
| 134 | 472 |
| 135 | 480 |
| 136 | 488 |
| 137 | 496 |
| 138 | 512 |
| 139 | 520 |
| 140 | 528 |
| 141 | 536 |
| 142 | 544 |
| 143 | 552 |
| 144 | 568 |
| 145 | 576 |
| 146 | 584 |
| 147 | 592 |
| 148 | 600 |

TABLE 3

Burst size (including burst CRC) table in bytes for downlink and uplink channels

| Burst Size Indicator | Number of Allocated LRU |  |  |  |  |  |  |  |  |  |  |  |
|---|---|---|---|---|---|---|---|---|---|---|---|---|
|  | 1 | 2 | 3 | 4 | 5 | 6 | 7 | 8 | 9 | 10 | 11 | 12 |
| 0 | 6 | 6 | 6 | 8 | 10 | 12 | 15 | 16 | 18 | 20 | 22 | 24 |
| 1 | 6 | 6 | 8 | 10 | 12 | 15 | 17 | 20 | 22 | 25 | 27 | 30 |
| 2 | 6 | 6 | 8 | 11 | 15 | 17 | 20 | 23 | 26 | 29 | 31 | 34 |
| 3 | 6 | 8 | 10 | 15 | 18 | 22 | 25 | 29 | 32 | 36 | 40 | 43 |
| 4 | 6 | 9 | 13 | 18 | 22 | 27 | 31 | 36 | 40 | 45 | 50 | 54 |
| 5 | 6 | 10 | 16 | 22 | 27 | 32 | 38 | 43 | 48 | 54 | 59 | 66 |
| 6 | 6 | 13 | 19 | 26 | 32 | 39 | 45 | 52 | 59 | 66 | 73 | 78 |
| 7 | 8 | 16 | 25 | 33 | 41 | 50 | 59 | 66 | 75 | 83 | 92 | 100 |
| 8 | 9 | 19 | 29 | 39 | 48 | 59 | 68 | 78 | 87 | 97 | 106 | 117 |
| 9 | 11 | 22 | 34 | 45 | 57 | 68 | 80 | 90 | 103 | 114 | 125 | 137 |
| 10 | 12 | 25 | 38 | 52 | 64 | 78 | 89 | 103 | 114 | 128 | 142 | 156 |
| 11 | 15 | 29 | 43 | 57 | 71 | 85 | 97 | 111 | 125 | 139 | 156 | 167 |
| 12 | 16 | 33 | 50 | 66 | 83 | 100 | 117 | 134 | 152 | 167 | 185 | 200 |
| 13 | 19 | 39 | 59 | 78 | 97 | 117 | 137 | 156 | 174 | 195 | 214 | 233 |
| 14 | 22 | 43 | 64 | 85 | 106 | 128 | 148 | 171 | 192 | 209 | 233 | 256 |
| 15 | 24 | 48 | 73 | 96 | 120 | 145 | 167 | 192 | 214 | 240 | 262 | 291 |
| 16 | 26 | 54 | 80 | 106 | 134 | 160 | 185 | 214 | 240 | 268 | 291 | 320 |
| 17 | 29 | 57 | 87 | 114 | 145 | 174 | 200 | 233 | 256 | 291 | 320 | 344 |
| 18 | 32 | 66 | 97 | 131 | 164 | 195 | 228 | 262 | 291 | 328 | 360 | 384 |
| 19 | 34 | 68 | 103 | 137 | 171 | 205 | 240 | 274 | 312 | 344 | 376 | 408 |
| 20 | 36 | 73 | 109 | 145 | 181 | 219 | 256 | 291 | 328 | 360 | 400 | 432 |
| 21 | 39 | 80 | 117 | 160 | 200 | 237 | 279 | 320 | 360 | 400 | 440 | 472 |
| 22 | 43 | 85 | 128 | 171 | 214 | 256 | 296 | 344 | 384 | 424 | 464 | 512 |
| 23 | 46 | 92 | 139 | 185 | 228 | 274 | 320 | 368 | 416 | 464 | 512 | 552 |

TABLE 3-continued

Burst size (including burst CRC) table in bytes for downlink and uplink channels

| | | | | | | | | | | | | |
|---|---|---|---|---|---|---|---|---|---|---|---|---|
| 24 | 50 | 100 | 148 | 200 | 250 | 296 | 352 | 400 | 456 | 496 | 544 | 600 |
| 25 | 52 | 103 | 156 | 209 | 262 | 312 | 368 | 416 | 472 | 520 | 576 | 624 |
| 26 | 54 | 109 | 164 | 219 | 274 | 328 | 376 | 432 | 488 | 544 | 600 | 656 |
| 27 | 57 | 114 | 174 | 233 | 291 | 344 | 408 | 464 | 520 | 576 | 640 | 704 |
| 28 | 62 | 123 | 185 | 244 | 304 | 368 | 432 | 496 | 552 | 624 | 688 | 736 |
| 29 | 64 | 128 | 195 | 256 | 328 | 384 | 456 | 520 | 584 | 656 | 720 | 768 |

| Burst Size | Number of Allocated LRU | | | | | | | | | | | |
|---|---|---|---|---|---|---|---|---|---|---|---|---|
| Indicator | 13 | 14 | 15 | 16 | 17 | 18 | 19 | 20 | 21 | 22 | 23 | 24 |
| 0 | 26 | 29 | 30 | 32 | 36 | 37 | 39 | 41 | 43 | 45 | 47 | 50 |
| 1 | 32 | 36 | 37 | 40 | 43 | 45 | 48 | 50 | 54 | 55 | 59 | 60 |
| 2 | 37 | 40 | 43 | 46 | 50 | 52 | 55 | 59 | 62 | 64 | 66 | 69 |
| 3 | 47 | 52 | 54 | 59 | 62 | 66 | 69 | 73 | 76 | 80 | 85 | 87 |
| 4 | 59 | 64 | 68 | 73 | 76 | 82 | 85 | 90 | 94 | 100 | 103 | 109 |
| 5 | 71 | 76 | 82 | 87 | 92 | 97 | 103 | 109 | 114 | 120 | 125 | 131 |
| 6 | 85 | 92 | 97 | 103 | 111 | 117 | 125 | 131 | 137 | 145 | 152 | 156 |
| 7 | 109 | 117 | 125 | 134 | 142 | 152 | 160 | 167 | 174 | 185 | 192 | 200 |
| 8 | 125 | 137 | 145 | 156 | 164 | 174 | 185 | 195 | 205 | 214 | 223 | 233 |
| 9 | 148 | 160 | 171 | 181 | 192 | 205 | 214 | 228 | 237 | 250 | 262 | 274 |
| 10 | 167 | 178 | 192 | 205 | 219 | 233 | 244 | 256 | 268 | 285 | 296 | 312 |
| 11 | 181 | 195 | 209 | 223 | 240 | 256 | 268 | 279 | 296 | 312 | 320 | 344 |
| 12 | 214 | 233 | 250 | 268 | 285 | 304 | 320 | 328 | 352 | 368 | 384 | 400 |
| 13 | 256 | 274 | 291 | 312 | 328 | 352 | 368 | 384 | 408 | 432 | 456 | 472 |
| 14 | 274 | 296 | 320 | 344 | 360 | 384 | 400 | 424 | 440 | 464 | 488 | 512 |
| 15 | 312 | 344 | 360 | 384 | 408 | 432 | 456 | 480 | 512 | 528 | 552 | 576 |
| 16 | 344 | 376 | 400 | 424 | 456 | 480 | 512 | 536 | 552 | 584 | 608 | 640 |
| 17 | 376 | 408 | 432 | 464 | 488 | 520 | 552 | 576 | 608 | 640 | 656 | 688 |
| 18 | 424 | 456 | 488 | 520 | 552 | 584 | 624 | 656 | 688 | 720 | 752 | 800 |
| 19 | 440 | 480 | 512 | 552 | 584 | 624 | 656 | 688 | 720 | 752 | 800 | 832 |
| 20 | 472 | 512 | 544 | 576 | 624 | 656 | 688 | 720 | 768 | 800 | 832 | 864 |
| 21 | 512 | 552 | 592 | 640 | 688 | 720 | 752 | 800 | 832 | 880 | 912 | 960 |
| 22 | 552 | 592 | 640 | 688 | 720 | 768 | 800 | 848 | 880 | 928 | 976 | 1024 |
| 23 | 600 | 640 | 688 | 736 | 800 | 832 | 880 | 928 | 976 | 1024 | 1056 | 1104 |
| 24 | 656 | 704 | 752 | 800 | 848 | 912 | 944 | 992 | 1040 | 1104 | 1152 | 1200 |
| 25 | 688 | 736 | 800 | 832 | 880 | 944 | 992 | 1040 | 1104 | 1152 | 1200 | 1248 |
| 26 | 704 | 768 | 816 | 864 | 928 | 976 | 1040 | 1088 | 1136 | 1200 | 1248 | 1296 |
| 27 | 752 | 816 | 864 | 928 | 992 | 1040 | 1104 | 1152 | 1224 | 1272 | 1320 | 1392 |
| 28 | 800 | 864 | 928 | 992 | 1056 | 1104 | 1168 | 1224 | 1296 | 1368 | 1416 | 1488 |
| 29 | 848 | 912 | 976 | 1040 | 1104 | 1168 | 1224 | 1296 | 1368 | 1440 | 1488 | 1560 |

| Burst Size | Number of Allocated LRU | | | | | | | | | | | |
|---|---|---|---|---|---|---|---|---|---|---|---|---|
| Indicator | 25 | 26 | 27 | 28 | 29 | 30 | 31 | 32 | 33 | 34 | 35 | 36 |
| 0 | 52 | 54 | 55 | 57 | 59 | 62 | 64 | 66 | 68 | 71 | 73 | 75 |
| 1 | 64 | 66 | 68 | 71 | 73 | 75 | 78 | 82 | 83 | 87 | 89 | 92 |
| 2 | 73 | 75 | 78 | 82 | 85 | 87 | 90 | 94 | 96 | 97 | 100 | 103 |
| 3 | 92 | 96 | 97 | 103 | 106 | 109 | 114 | 117 | 120 | 125 | 128 | 131 |
| 4 | 111 | 117 | 120 | 125 | 131 | 134 | 139 | 145 | 148 | 152 | 156 | 164 |
| 5 | 134 | 142 | 145 | 152 | 156 | 164 | 167 | 174 | 178 | 185 | 192 | 195 |
| 6 | 164 | 171 | 178 | 185 | 192 | 195 | 205 | 209 | 214 | 223 | 228 | 237 |
| 7 | 209 | 214 | 223 | 233 | 240 | 250 | 256 | 268 | 274 | 285 | 291 | 304 |
| 8 | 244 | 256 | 262 | 274 | 285 | 291 | 304 | 312 | 320 | 328 | 344 | 352 |
| 9 | 285 | 296 | 304 | 320 | 328 | 344 | 352 | 360 | 376 | 384 | 400 | 408 |
| 10 | 320 | 328 | 344 | 360 | 376 | 384 | 400 | 408 | 424 | 440 | 456 | 464 |
| 11 | 352 | 368 | 376 | 400 | 408 | 424 | 432 | 456 | 464 | 480 | 496 | 512 |
| 12 | 416 | 432 | 456 | 464 | 480 | 496 | 520 | 536 | 552 | 568 | 584 | 600 |
| 13 | 488 | 512 | 528 | 544 | 568 | 584 | 608 | 624 | 640 | 656 | 688 | 704 |
| 14 | 528 | 552 | 576 | 592 | 608 | 640 | 656 | 688 | 704 | 720 | 736 | 768 |
| 15 | 600 | 624 | 656 | 688 | 704 | 720 | 752 | 768 | 800 | 816 | 848 | 864 |
| 16 | 656 | 688 | 720 | 752 | 768 | 800 | 832 | 848 | 880 | 912 | 928 | 960 |
| 17 | 720 | 752 | 768 | 816 | 832 | 864 | 912 | 928 | 960 | 976 | 1024 | 1040 |
| 18 | 816 | 848 | 880 | 912 | 944 | 976 | 1024 | 1040 | 1072 | 1104 | 1136 | 1168 |
| 19 | 864 | 880 | 928 | 960 | 992 | 1024 | 1072 | 1104 | 1136 | 1168 | 1200 | 1248 |
| 20 | 912 | 944 | 976 | 1024 | 1056 | 1088 | 1136 | 1152 | 1200 | 1224 | 1272 | 1296 |
| 21 | 992 | 1040 | 1072 | 1104 | 1152 | 1184 | 1224 | 1272 | 1320 | 1368 | 1392 | 1440 |
| 22 | 1056 | 1104 | 1152 | 1184 | 1224 | 1272 | 1320 | 1368 | 1392 | 1440 | 1488 | 1536 |
| 23 | 1152 | 1200 | 1248 | 1296 | 1320 | 1392 | 1440 | 1488 | 1536 | 1560 | 1608 | 1656 |
| 24 | 1248 | 1296 | 1368 | 1392 | 1440 | 1488 | 1536 | 1584 | 1632 | 1704 | 1752 | 1800 |
| 25 | 1320 | 1368 | 1416 | 1464 | 1536 | 1560 | 1632 | 1656 | 1728 | 1776 | 1824 | 1888 |
| 26 | 1368 | 1416 | 1464 | 1536 | 1584 | 1632 | 1704 | 1728 | 1800 | 1856 | 1888 | 1952 |
| 27 | 1440 | 1488 | 1560 | 1632 | 1704 | 1728 | 1800 | 1856 | 1920 | 1984 | 2048 | 2080 |
| 28 | 1536 | 1608 | 1656 | 1728 | 1776 | 1856 | 1920 | 1984 | 2048 | 2112 | 2144 | 2208 |
| 29 | 1632 | 1704 | 1752 | 1824 | 1888 | 1952 | 1984 | 2080 | 2144 | 2208 | 2272 | 2336 |

TABLE 3-continued

Burst size (including burst CRC) table in bytes for downlink and uplink channels

| Burst Size | Number of Allocated LRU | | | | | | | | | | | |
|---|---|---|---|---|---|---|---|---|---|---|---|---|
| Indicator | 37 | 38 | 39 | 40 | 41 | 42 | 43 | 44 | 45 | 46 | 47 | 48 |
| 0 | 76 | 78 | 80 | 82 | 85 | 87 | 89 | 90 | 92 | 94 | 96 | 97 |
| 1 | 94 | 96 | 97 | 100 | 103 | 106 | 109 | 111 | 114 | 117 | 120 | 120 |
| 2 | 106 | 111 | 114 | 117 | 120 | 123 | 125 | 128 | 131 | 134 | 137 | 139 |
| 3 | 134 | 139 | 142 | 145 | 148 | 152 | 156 | 160 | 164 | 167 | 171 | 174 |
| 4 | 167 | 171 | 174 | 181 | 185 | 188 | 192 | 200 | 200 | 209 | 209 | 214 |
| 5 | 200 | 205 | 214 | 219 | 223 | 228 | 233 | 240 | 244 | 250 | 256 | 262 |
| 6 | 244 | 250 | 256 | 262 | 268 | 274 | 285 | 291 | 296 | 304 | 312 | 312 |
| 7 | 312 | 320 | 328 | 328 | 344 | 352 | 360 | 368 | 376 | 384 | 400 | 400 |
| 8 | 360 | 368 | 384 | 384 | 400 | 408 | 416 | 432 | 440 | 456 | 456 | 472 |
| 9 | 416 | 432 | 440 | 456 | 464 | 480 | 488 | 496 | 512 | 520 | 536 | 544 |
| 10 | 472 | 488 | 496 | 512 | 528 | 536 | 552 | 568 | 576 | 592 | 608 | 624 |
| 11 | 520 | 536 | 552 | 568 | 576 | 592 | 608 | 624 | 640 | 640 | 656 | 688 |
| 12 | 624 | 640 | 656 | 656 | 688 | 704 | 720 | 736 | 752 | 768 | 800 | 800 |
| 13 | 720 | 736 | 768 | 768 | 800 | 816 | 832 | 864 | 880 | 912 | 912 | 944 |
| 14 | 800 | 800 | 832 | 848 | 864 | 880 | 912 | 928 | 960 | 976 | 992 | 1024 |
| 15 | 880 | 912 | 944 | 960 | 992 | 1024 | 1040 | 1056 | 1088 | 1104 | 1136 | 1152 |
| 16 | 992 | 1024 | 1040 | 1072 | 1088 | 1104 | 1152 | 1168 | 1200 | 1224 | 1248 | 1272 |
| 17 | 1072 | 1104 | 1136 | 1152 | 1184 | 1224 | 1248 | 1272 | 1296 | 1320 | 1368 | 1392 |
| 18 | 1200 | 1248 | 1272 | 1296 | 1320 | 1368 | 1392 | 1440 | 1464 | 1488 | 1536 | 1560 |
| 19 | 1272 | 1296 | 1320 | 1368 | 1416 | 1440 | 1488 | 1488 | 1536 | 1584 | 1608 | 1656 |
| 20 | 1320 | 1368 | 1416 | 1440 | 1488 | 1536 | 1560 | 1584 | 1632 | 1656 | 1704 | 1728 |
| 21 | 1464 | 1488 | 1536 | 1584 | 1632 | 1656 | 1704 | 1752 | 1776 | 1824 | 1856 | 1920 |
| 22 | 1584 | 1608 | 1656 | 1704 | 1752 | 1776 | 1824 | 1856 | 1920 | 1952 | 1984 | 2048 |
| 23 | 1704 | 1752 | 1800 | 1856 | 1888 | 1952 | 1984 | 2048 | 2080 | 2112 | 2176 | 2208 |
| 24 | 1856 | 1888 | 1952 | 1984 | 2048 | 2080 | 2144 | 2208 | 2272 | 2304 | 2336 | 2400 |
| 25 | 1952 | 1984 | 2048 | 2080 | 2144 | 2208 | 2272 | 2304 | 2368 | 2400 | 2480 | 2480 |
| 26 | 1984 | 2080 | 2112 | 2176 | 2208 | 2272 | 2336 | 2400 | 2440 | 2480 | 2560 | 2600 |
| 27 | 2144 | 2208 | 2272 | 2304 | 2368 | 2440 | 2480 | 2560 | 2600 | 2680 | 2720 | 2760 |
| 28 | 2272 | 2336 | 2400 | 2480 | 2560 | 2600 | 2640 | 2720 | 2760 | 2840 | 2880 | 2960 |
| 29 | 2400 | 2480 | 2560 | 2600 | 2680 | 2720 | 2760 | 2880 | 2920 | 3000 | 3072 | 3120 |

| Burst Size | Number of Allocated LRU | | | | | | | | | | | |
|---|---|---|---|---|---|---|---|---|---|---|---|---|
| Indicator | 49 | 50 | 51 | 52 | 53 | 54 | 55 | 56 | 57 | 58 | 59 | 60 |
| 0 | 100 | 103 | 106 | 106 | 109 | 111 | 114 | 114 | 117 | 120 | 120 | 123 |
| 1 | 125 | 125 | 128 | 131 | 134 | 137 | 139 | 142 | 145 | 145 | 148 | 152 |
| 2 | 142 | 145 | 148 | 152 | 156 | 156 | 160 | 164 | 164 | 167 | 171 | 174 |
| 3 | 178 | 181 | 185 | 192 | 192 | 195 | 200 | 205 | 209 | 214 | 214 | 219 |
| 4 | 219 | 223 | 228 | 233 | 237 | 244 | 250 | 250 | 256 | 262 | 268 | 268 |
| 5 | 268 | 274 | 279 | 285 | 291 | 291 | 296 | 304 | 312 | 312 | 320 | 328 |
| 6 | 320 | 328 | 328 | 344 | 344 | 352 | 360 | 368 | 376 | 384 | 384 | 400 |
| 7 | 408 | 416 | 424 | 432 | 440 | 456 | 456 | 464 | 472 | 480 | 496 | 496 |
| 8 | 480 | 488 | 496 | 512 | 520 | 528 | 536 | 544 | 552 | 568 | 576 | 584 |
| 9 | 552 | 568 | 576 | 592 | 608 | 608 | 624 | 640 | 640 | 656 | 656 | 688 |
| 10 | 624 | 640 | 656 | 656 | 688 | 688 | 704 | 720 | 736 | 752 | 752 | 768 |
| 11 | 688 | 704 | 720 | 736 | 752 | 768 | 768 | 800 | 800 | 816 | 832 | 848 |
| 12 | 816 | 832 | 848 | 864 | 880 | 912 | 912 | 928 | 960 | 976 | 992 | 992 |
| 13 | 960 | 976 | 992 | 1024 | 1040 | 1056 | 1072 | 1088 | 1104 | 1136 | 1152 | 1168 |
| 14 | 1040 | 1056 | 1088 | 1104 | 1136 | 1152 | 1168 | 1184 | 1200 | 1224 | 1248 | 1272 |
| 15 | 1184 | 1200 | 1224 | 1248 | 1272 | 1296 | 1320 | 1368 | 1368 | 1392 | 1416 | 1440 |
| 16 | 1296 | 1320 | 1368 | 1392 | 1416 | 1440 | 1464 | 1488 | 1536 | 1536 | 1560 | 1608 |
| 17 | 1416 | 1440 | 1464 | 1488 | 1536 | 1560 | 1584 | 1608 | 1656 | 1656 | 1704 | 1728 |
| 18 | 1608 | 1632 | 1656 | 1704 | 1728 | 1752 | 1800 | 1824 | 1856 | 1888 | 1920 | 1952 |
| 19 | 1704 | 1728 | 1752 | 1776 | 1824 | 1856 | 1888 | 1920 | 1952 | 1984 | 2048 | 2048 |
| 20 | 1776 | 1824 | 1856 | 1888 | 1920 | 1952 | 1984 | 2048 | 2080 | 2112 | 2144 | 2176 |
| 21 | 1952 | 1984 | 2048 | 2080 | 2112 | 2144 | 2176 | 2208 | 2272 | 2304 | 2336 | 2368 |
| 22 | 2080 | 2112 | 2176 | 2208 | 2272 | 2304 | 2336 | 2368 | 2440 | 2480 | 2480 | 2560 |
| 23 | 2272 | 2304 | 2368 | 2400 | 2440 | 2480 | 2560 | 2600 | 2640 | 2680 | 2720 | 2760 |
| 24 | 2440 | 2480 | 2560 | 2600 | 2640 | 2680 | 2720 | 2760 | 2840 | 2880 | 2920 | 3000 |
| 25 | 2560 | 2600 | 2680 | 2720 | 2760 | 2840 | 2880 | 2920 | 3000 | 3072 | 3072 | 3120 |
| 26 | 2680 | 2720 | 2760 | 2840 | 2880 | 2920 | 3000 | 3072 | 3120 | 3168 | 3216 | 3264 |
| 27 | 2840 | 2880 | 2960 | 2976 | 3072 | 3120 | 3168 | 3264 | 3312 | 3408 | 3408 | 3456 |
| 28 | 2976 | 3072 | 3168 | 3216 | 3264 | 3312 | 3408 | 3456 | 3504 | 3552 | 3640 | 3696 |
| 29 | 3168 | 3264 | 3312 | 3408 | 3456 | 3504 | 3600 | 3640 | 3696 | 3752 | 3808 | 3864 |

| Burst Size | Number of Allocated LRU | | | | | | | | | | | |
|---|---|---|---|---|---|---|---|---|---|---|---|---|
| Indicator | 61 | 62 | 63 | 64 | 65 | 66 | 67 | 68 | 69 | 70 | 71 | 72 |
| 0 | 125 | 128 | 128 | 131 | 134 | 137 | 139 | 139 | 142 | 145 | 145 | 148 |
| 1 | 156 | 156 | 160 | 164 | 164 | 167 | 171 | 171 | 174 | 178 | 178 | 181 |
| 2 | 178 | 181 | 185 | 185 | 188 | 192 | 195 | 195 | 200 | 205 | 205 | 209 |

TABLE 3-continued

Burst size (including burst CRC) table in bytes for downlink and uplink channels

| | | | | | | | | | | | | |
|---|---|---|---|---|---|---|---|---|---|---|---|---|
| 3 | 223 | 228 | 228 | 233 | 237 | 240 | 244 | 250 | 250 | 256 | 256 | 262 |
| 4 | 274 | 279 | 285 | 291 | 291 | 296 | 304 | 304 | 312 | 312 | 320 | 328 |
| 5 | 328 | 344 | 344 | 352 | 352 | 360 | 368 | 368 | 376 | 384 | 384 | 384 |
| 6 | 400 | 408 | 416 | 416 | 424 | 432 | 440 | 440 | 456 | 456 | 464 | 472 |
| 7 | 512 | 520 | 528 | 536 | 544 | 552 | 552 | 568 | 576 | 584 | 592 | 600 |
| 8 | 592 | 608 | 608 | 624 | 640 | 640 | 656 | 656 | 688 | 688 | 688 | 704 |
| 9 | 688 | 704 | 720 | 720 | 736 | 752 | 768 | 768 | 768 | 800 | 800 | 816 |
| 10 | 800 | 800 | 816 | 816 | 832 | 848 | 864 | 880 | 880 | 912 | 912 | 928 |
| 11 | 864 | 880 | 880 | 912 | 912 | 928 | 944 | 960 | 976 | 992 | 992 | 1024 |
| 12 | 1024 | 1040 | 1056 | 1072 | 1088 | 1104 | 1104 | 1136 | 1152 | 1168 | 1184 | 1200 |
| 13 | 1184 | 1200 | 1224 | 1248 | 1272 | 1296 | 1296 | 1320 | 1368 | 1368 | 1392 | 1416 |
| 14 | 1296 | 1320 | 1320 | 1368 | 1368 | 1392 | 1416 | 1440 | 1464 | 1488 | 1488 | 1536 |
| 15 | 1464 | 1488 | 1536 | 1536 | 1560 | 1584 | 1608 | 1632 | 1656 | 1704 | 1704 | 1728 |
| 16 | 1632 | 1656 | 1656 | 1704 | 1728 | 1752 | 1776 | 1824 | 1824 | 1856 | 1888 | 1920 |
| 17 | 1752 | 1800 | 1824 | 1856 | 1888 | 1920 | 1952 | 1952 | 1984 | 2048 | 2048 | 2080 |
| 18 | 1984 | 2048 | 2048 | 2080 | 2112 | 2144 | 2176 | 2208 | 2272 | 2272 | 2304 | 2336 |
| 19 | 2080 | 2144 | 2176 | 2208 | 2208 | 2272 | 2304 | 2336 | 2368 | 2400 | 2440 | 2480 |
| 20 | 2208 | 2272 | 2272 | 2304 | 2368 | 2400 | 2440 | 2480 | 2480 | 2560 | 2560 | 2600 |
| 21 | 2440 | 2480 | 2480 | 2560 | 2560 | 2600 | 2640 | 2680 | 2720 | 2760 | 2840 | 2840 |
| 22 | 2600 | 2640 | 2680 | 2720 | 2760 | 2840 | 2840 | 2880 | 2920 | 2960 | 2976 | 3072 |
| 23 | 2840 | 2880 | 2920 | 2960 | 3000 | 3072 | 3072 | 3120 | 3168 | 3216 | 3264 | 3312 |
| 24 | 3072 | 3072 | 3120 | 3168 | 3216 | 3312 | 3312 | 3408 | 3456 | 3504 | 3552 | 3552 |
| 25 | 3216 | 3264 | 3312 | 3312 | 3408 | 3456 | 3504 | 3552 | 3640 | 3640 | 3696 | 3752 |
| 26 | 3312 | 3408 | 3408 | 3456 | 3552 | 3600 | 3640 | 3696 | 3752 | 3808 | 3864 | 3864 |
| 27 | 3552 | 3600 | 3640 | 3696 | 3752 | 3808 | 3864 | 3976 | 3976 | 4032 | 4144 | 4200 |
| 28 | 3752 | 3808 | 3864 | 3976 | 4032 | 4088 | 4144 | 4200 | 4224 | 4288 | 4352 | 4416 |
| 29 | 3976 | 4032 | 4088 | 4144 | 4224 | 4288 | 4352 | 4416 | 4544 | 4544 | 4608 | 4672 |

| Burst Size Indicator | Number of Allocated LRU | | | | | | | | | | | |
|---|---|---|---|---|---|---|---|---|---|---|---|---|
| | 73 | 74 | 75 | 76 | 77 | 78 | 79 | 80 | 81 | 82 | 83 | 84 |
| 0 | 152 | 152 | 156 | 156 | 160 | 160 | 164 | 164 | 167 | 171 | 171 | 174 |
| 1 | 185 | 188 | 188 | 192 | 195 | 195 | 200 | 200 | 205 | 209 | 209 | 214 |
| 2 | 214 | 214 | 219 | 219 | 223 | 228 | 228 | 233 | 237 | 237 | 240 | 244 |
| 3 | 268 | 268 | 274 | 279 | 279 | 285 | 291 | 291 | 296 | 296 | 304 | 304 |
| 4 | 328 | 328 | 344 | 344 | 344 | 352 | 352 | 360 | 368 | 368 | 376 | 376 |
| 5 | 400 | 400 | 408 | 416 | 416 | 424 | 432 | 432 | 440 | 440 | 456 | 456 |
| 6 | 480 | 488 | 496 | 496 | 512 | 512 | 520 | 528 | 528 | 536 | 544 | 552 |
| 7 | 608 | 624 | 624 | 640 | 640 | 656 | 656 | 656 | 688 | 688 | 688 | 704 |
| 8 | 720 | 720 | 736 | 736 | 752 | 768 | 768 | 768 | 800 | 800 | 816 | 816 |
| 9 | 832 | 848 | 848 | 864 | 880 | 880 | 912 | 912 | 912 | 928 | 944 | 960 |
| 10 | 944 | 944 | 960 | 976 | 992 | 992 | 1024 | 1024 | 1040 | 1056 | 1072 | 1072 |
| 11 | 1024 | 1040 | 1056 | 1072 | 1088 | 1104 | 1104 | 1136 | 1136 | 1152 | 1168 | 1184 |
| 12 | 1224 | 1248 | 1248 | 1272 | 1296 | 1296 | 1320 | 1320 | 1368 | 1368 | 1392 | 1392 |
| 13 | 1416 | 1440 | 1464 | 1488 | 1488 | 1536 | 1536 | 1560 | 1584 | 1608 | 1608 | 1632 |
| 14 | 1536 | 1560 | 1584 | 1608 | 1632 | 1656 | 1656 | 1704 | 1728 | 1728 | 1752 | 1776 |
| 15 | 1752 | 1776 | 1800 | 1824 | 1856 | 1888 | 1888 | 1920 | 1952 | 1984 | 1984 | 2048 |
| 16 | 1952 | 1984 | 1984 | 2048 | 2048 | 2080 | 2112 | 2144 | 2144 | 2176 | 2208 | 2208 |
| 17 | 2112 | 2144 | 2176 | 2208 | 2208 | 2272 | 2272 | 2304 | 2336 | 2368 | 2400 | 2440 |
| 18 | 2368 | 2400 | 2440 | 2480 | 2480 | 2560 | 2560 | 2600 | 2640 | 2600 | 2720 | 2720 |
| 19 | 2480 | 2560 | 2560 | 2600 | 2640 | 2680 | 2720 | 2760 | 2760 | 2840 | 2840 | 2880 |
| 20 | 2640 | 2680 | 2720 | 2760 | 2760 | 2840 | 2880 | 2880 | 2920 | 2960 | 2976 | 3072 |
| 21 | 2880 | 2920 | 2960 | 2976 | 3072 | 3120 | 3120 | 3168 | 3216 | 3264 | 3312 | 3312 |
| 22 | 3120 | 3168 | 3168 | 3216 | 3264 | 3312 | 3312 | 3408 | 3456 | 3504 | 3504 | 3552 |
| 23 | 3408 | 3408 | 3456 | 3504 | 3552 | 3600 | 3640 | 3696 | 3752 | 3808 | 3808 | 3864 |
| 24 | 3640 | 3696 | 3752 | 3808 | 3864 | 3864 | 3976 | 3976 | 4032 | 4088 | 4144 | 4200 |
| 25 | 3808 | 3864 | 3976 | 3976 | 4032 | 4088 | 4144 | 4200 | 4224 | 4288 | 4352 | 4416 |
| 26 | 3976 | 4032 | 4088 | 4144 | 4200 | 4224 | 4288 | 4352 | 4416 | 4416 | 4544 | 4544 |
| 27 | 4224 | 4288 | 4352 | 4416 | 4416 | 4544 | 4608 | 4608 | 4672 | 4736 | 4824 | 4896 |
| 28 | 4544 | 4544 | 4608 | 4672 | 4736 | 4824 | 4896 | 4896 | 4968 | 5112 | 5112 | 5184 |
| 29 | 4736 | 4824 | 4896 | 4968 | 4968 | 5112 | 5112 | 5184 | 5256 | 5328 | 5400 | 5440 |

| Burst Size Indicator | Number of Allocated LRU | | | | | | | | | | | |
|---|---|---|---|---|---|---|---|---|---|---|---|---|
| | 85 | 86 | 87 | 88 | 89 | 90 | 91 | 92 | 93 | 94 | 95 | 96 |
| 0 | 174 | 178 | 178 | 181 | 185 | 185 | 188 | 188 | 192 | 192 | 195 | 195 |
| 1 | 214 | 219 | 219 | 223 | 223 | 228 | 228 | 233 | 237 | 237 | 240 | 244 |
| 2 | 250 | 250 | 250 | 256 | 256 | 262 | 262 | 268 | 268 | 274 | 274 | 279 |
| 3 | 312 | 312 | 320 | 320 | 328 | 328 | 328 | 344 | 344 | 344 | 344 | 352 |
| 4 | 384 | 384 | 384 | 400 | 400 | 408 | 408 | 416 | 416 | 424 | 424 | 432 |
| 5 | 464 | 464 | 472 | 480 | 488 | 488 | 496 | 496 | 512 | 512 | 520 | 520 |
| 6 | 552 | 568 | 568 | 576 | 584 | 592 | 600 | 608 | 608 | 624 | 624 | 624 |
| 7 | 704 | 720 | 720 | 736 | 736 | 752 | 768 | 768 | 768 | 800 | 800 | 800 |
| 8 | 832 | 832 | 848 | 864 | 864 | 880 | 880 | 912 | 912 | 912 | 928 | 944 |
| 9 | 960 | 976 | 992 | 992 | 1024 | 1024 | 1040 | 1040 | 1056 | 1072 | 1072 | 1088 |

TABLE 3-continued

Burst size (including burst CRC) table in bytes for downlink and uplink channels

| | | | | | | | | | | | | |
|---|---|---|---|---|---|---|---|---|---|---|---|---|
| 10 | 1088 | 1104 | 1104 | 1136 | 1152 | 1152 | 1168 | 1184 | 1200 | 1200 | 1224 | 1224 |
| 11 | 1200 | 1200 | 1224 | 1248 | 1248 | 1272 | 1272 | 1296 | 1320 | 1320 | 1320 | 1368 |
| 12 | 1416 | 1440 | 1464 | 1464 | 1488 | 1488 | 1536 | 1536 | 1560 | 1560 | 1584 | 1608 |
| 13 | 1656 | 1656 | 1704 | 1728 | 1728 | 1752 | 1776 | 1800 | 1824 | 1824 | 1856 | 1888 |
| 14 | 1800 | 1824 | 1856 | 1856 | 1888 | 1920 | 1920 | 1952 | 1984 | 1984 | 1984 | 2048 |
| 15 | 2048 | 2080 | 2080 | 2112 | 2144 | 2176 | 2176 | 2208 | 2208 | 2272 | 2272 | 2304 |
| 16 | 2272 | 2304 | 2304 | 2336 | 2368 | 2400 | 2440 | 2440 | 2480 | 2480 | 2560 | 2560 |
| 17 | 2440 | 2480 | 2480 | 2560 | 2560 | 2600 | 2640 | 2640 | 2680 | 2720 | 2760 | 2760 |
| 18 | 2760 | 2840 | 2840 | 2880 | 2920 | 2920 | 2960 | 2976 | 3072 | 3072 | 3120 | 3120 |
| 19 | 2920 | 2960 | 3000 | 2976 | 3072 | 3072 | 3120 | 3168 | 3216 | 3216 | 3264 | 3312 |
| 20 | 3072 | 3120 | 3168 | 3168 | 3216 | 3264 | 3312 | 3312 | 3408 | 3408 | 3456 | 3456 |
| 21 | 3408 | 3408 | 3456 | 3504 | 3552 | 3552 | 3584 | 3640 | 3696 | 3752 | 3752 | 3808 |
| 22 | 3640 | 3640 | 3696 | 3752 | 3808 | 3808 | 3864 | 3864 | 3976 | 3976 | 4032 | 4088 |
| 23 | 3976 | 3976 | 4032 | 4088 | 4088 | 4144 | 4200 | 4224 | 4288 | 4352 | 4416 | 4416 |
| 24 | 4224 | 4288 | 4352 | 4416 | 4416 | 4544 | 4544 | 4608 | 4608 | 4672 | 4736 | 4800 |
| 25 | 4416 | 4544 | 4544 | 4608 | 4672 | 4736 | 4736 | 4824 | 4896 | 4896 | 4968 | 4968 |
| 26 | 4608 | 4672 | 4736 | 4800 | 4824 | 4896 | 4968 | 4968 | 5112 | 5112 | 5184 | 5184 |
| 27 | 4896 | 4968 | 5112 | 5112 | 5184 | 5184 | 5256 | 5328 | 5400 | 5440 | 5520 | 5520 |
| 28 | 5256 | 5328 | 5328 | 5440 | 5520 | 5520 | 5680 | 5680 | 5760 | 5760 | 5840 | 5920 |
| 29 | 5520 | 5520 | 5680 | 5760 | 5760 | 5840 | 5920 | 6000 | 6072 | 6072 | 6248 | 6248 |

Figure 8:
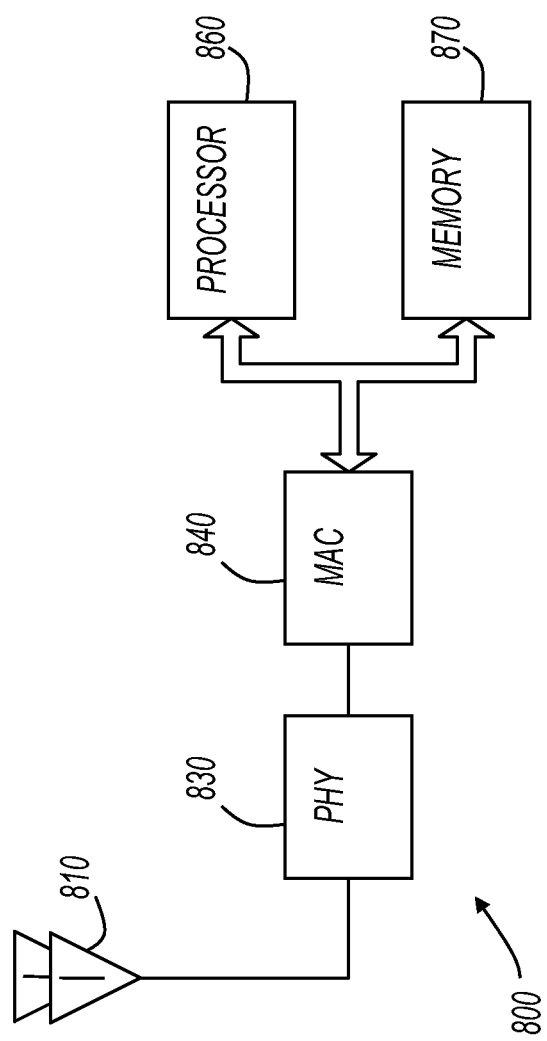
FIG. 8 shows an electronic system in accordance with various embodiments of the present invention.

FIG. 8 shows a system diagram in accordance with various embodiments of the present invention. Electronic system 800 includes antennas 810, physical layer (PHY) 830, media access control (MAC) layer 840, processor 860, and memory 870. In some embodiments, electronic system 800 may be a base station that determines upload and download burst sizes and populates MAP IEs as described above with reference to the previous figures. In other embodiments, electronic system 800 may be a mobile station that reads and interprets MAP IEs as described above with reference to the previous figures. For example, electronic system 800 may be utilized in a wireless network as base station 110, relay station 120, or mobile station 130 (FIG. 1). Also for example, electronic system 800 may be a station capable of performing the calculations shown in any of the equations above.

In some embodiments, electronic system 800 may represent a system that includes a base station, a relay station, or a mobile station as well as other circuits. For example, in some embodiments, electronic system 800 may be a computer, such as a personal computer, a workstation, or the like, that includes a base station or mobile station as a peripheral or as an integrated unit. Further, electronic system 800 may include a series of base stations that are coupled together in a network.

In operation, system 800 sends and receives signals using antennas 810, and the signals are processed by the various elements shown in FIG. 8. In some embodiments, antennas 810 may be an antenna array or any type of antenna structure that supports MIMO processing. In other embodiments, antennas 810 may include a single antenna. System 800 may operate in partial compliance with, or in complete compliance with, a wireless network standard such as an IEEE 802.16 standard.

Physical layer (PHY) 830 is coupled to antennas 810 to interact with a wireless network. PHY 830 may include circuitry to support the transmission and reception of radio frequency (RF) signals. For example, in some embodiments, PHY 830 includes an RF receiver to receive signals and perform "front end" processing as low-noise amplification (LNA), filtering, frequency conversion or the like. Further, in some embodiments, PHY 830 includes transform mechanisms and beamforming circuitry to support MIMO signal processing. Also for example, in some embodiments, PHY 830 includes circuits to support frequency up-conversion, and an RF transmitter. In some embodiments, PHY 830 includes circuits to determine burst sizes and to populate MAP IEs. In other embodiments, PHY 830 includes circuits to interpret the contents of MAP IEs and to determine burst sizes.

Media access control (MAC) layer 840 may be any suitable media access control layer implementation. For example, MAC 840 may be implemented in software, or hardware or any combination thereof. In some embodiments, a portion of MAC 840 may be implemented in hardware, and a portion may be implemented in software that is executed by processor 860. Further, MAC 840 may include a processor separate from processor 860.

In operation, processor 860 reads instructions and data from memory 870 and performs actions in response thereto. For example, processor 860 may access instructions from memory 870 and perform method embodiments of the present invention, such as method 400 (FIG. 4), 500 (FIG. 5), 600 (FIG. 6), or method 700 (FIG. 7) or methods described with reference to other figures. Processor 860 represents any type of processor, including but not limited to, a microprocessor, a digital signal processor, a microcontroller, or the like.

Memory 870 represents an article that includes a machine readable medium. For example, memory 870 represents a random access memory (RAM), dynamic random access memory (DRAM), static random access memory (SRAM), read only memory (ROM), flash memory, or any other type of article that includes a medium readable by processor 860. Memory 870 may store instructions for performing the execution of the various method embodiments of the present invention. In some embodiments, memory 870 may store tables such as the Tables shown above.

Although the various elements of system 800 are shown separate in FIG. 8, embodiments exist that combine the circuitry of processor 860, memory 870, and MAC 840 in a single integrated circuit. For example, memory 870 may be an internal memory within processor 860 or may be a microprogram control store within processor 860. In some embodiments, the various elements of system 800 may be separately packaged and mounted on a common circuit board. In other embodiments, the various elements are separate integrated circuit dice packaged together, such as in a multi-chip module, and in still further embodiments, various elements are on the same integrated circuit die.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method executable by a base station, the method comprising:
   populating at the base station a download (DL) MAP information element (IE) with information indicative of a number of logical resource units (LRUs) allocated for a download burst;
   populating at the base station the DL MAP IE with a first index to a first table, the first table comprising a modulation order M of the download burst as a function of the number LRUs allocated for the download burst and as a function of spectral efficiency of the download burst, the information indicative of the number of LRUs allocated for the download burst and the first index to the first table forming a second index to a burst size table, the burst size table comprising a burst size and a segmentation rule for the download burst as a function of the second index;
   wherein burst sizes larger than a predetermined size are segmented into multiple forward error correction (FEC) blocks having a same size according to the segmentation rule for the second index corresponding to each burst size larger than the predetermined size; and
   transmitting the DL MAP IL to the mobile station.

2. The method of claim 1, wherein the first index is five bits in length.

3. The method of claim 1, further comprising transmitting to a mobile station at least one burst of data in the download burst.

4. The method of claim 3, further comprising transmitting multiple forward error correction (FEC) blocks when the burst size of the download burst is greater than 600 bytes.

5. A method executable by a base station, the method comprising:
   populating at the base station an upload (UL) MAP information element (IE) with information indicative of a number of logical resource units (LRUs) allocated for an upload burst;
   populating at the base station the UL MAP IE with a first index to a first table, the first table comprising a modulation order M of the upload burst as a function of the number LRUs allocated for the upload burst and as a function of spectral efficiency of the upload burst, the information indicative of the number of LRUs allocated for the upload burst and the first index to the first table forming a second index to a burst size table, the burst size table comprising a burst size and a segmentation rule for the upload burst as a function of the second index;
   wherein burst sizes larger than a predetermined size are segmented into multiple forward error correction (FEC) blocks having a same size according to the segmentation rule for the second index corresponding to each burst size larger than the predetermined size; and
   transmitting the UL MAP IE to the mobile station.

6. The method of claim 5, wherein the first index is five bits in length.

7. The method of claim 5, further comprising receiving from the mobile station at least one burst of data in the upload burst.

8. A method executable by a mobile station, the method comprising:
   receiving a download (DL) MAP information element (IE) transmitted to the mobile station from a base station or a relay station;
   reading at the mobile station from the DL MAP IE information indicative of a number of logical resource units (LRUs) allocated for a download burst;
   reading at the mobile station from the DL MAP IE a first index to a first table, the first table comprising a modulation order M of the download burst as a function of the number LRUs allocated for the download burst and as a function of spectral efficiency of the download burst; and
   determining at the mobile station a second index based on the information indicative of the number of LRUs allocated for the download burst and the first index to the first table, the second index forming an index to a burst size table, the burst size table comprising a burst size and a segmentation rule for the download burst as a function of the second index;
   wherein burst sizes larger than a predetermined size are segmented into multiple forward error correction (FEC) blocks having a same size according to the segmentation rule for the second index corresponding to each burst size larger than the predetermined size.

9. The method of claim 8, wherein the first index is five bits in length.

10. The method of claim 8, further comprising receiving at least one burst of data in the download burst.

11. The method of claim 10, further comprising receiving multiple forward error correction (FEC) blocks when the burst size of the download burst is greater than 600 bytes.

12. A method executable by a mobile station, the method comprising:
   receiving at the mobile station an upload (UL) MAP information element (IE) from a base station or a relay station;
   reading at the mobile station from the UL MAP IE information indicative of a number of logical resource units (LRUs) allocated for an upload burst;
   reading at the mobile station from the DL MAP IE a first index to a first table, the first table comprising a modulation order M of the upload burst as a function of the number LRUs allocated for the upload burst and as a function of spectral efficiency of the upload burst; and
   determining at the mobile station a second index based on the information indicative of the number of LRUs allocated for the upload burst and the first index to the first table, the second index forming an index to a burst size table, the burst size table comprising a burst size and a segmentation rule for the upload burst as a function of the second index;
   wherein burst sizes larger than a predetermined size are segmented into multiple forward error correction (FEC) blocks having a same size according to the segmentation rule for the second index corresponding to each burst size larger than the predetermined size.

13. The method of claim 12, wherein the first index is five bits in length.

14. The method of claim 12, further comprising transmitting at least one burst of data in the upload burst.

15. The method of claim 14, further comprising transmitting multiple forward error correction (FEC) blocks when the burst size of the upload burst is greater than 600 bytes.

16. A non-transitory computer-readable medium having instructions stored thereon that when accessed result in a mobile station performing:
- determining at the mobile station a first index as idx=$I_{MinimalSize}+I_{SizeOffset}$ in which $I_{MinimalSize}$ is derived from a number of logical resource units (LRUs) allocated to a burst, and $I_{SizeOffset}$ is a second index retrieved from an MAP information element (IE) in an IEEE 802.16 compliant system, the second index being an index to a modulation order table that comprises a modulation order M of the burst as a function of the number LRUs allocated for the burst and as a function of spectral efficiency of the burst; and
- determining at the mobile station a burst size by indexing into a burst size table using the first index, the burst size table comprising a burst size and a segmentation rule for the burst as a function of the first index, and burst sizes in the burst size table being independent of the number of LRUs allocated for the burst;
- wherein burst sizes larger than a predetermined size are segmented into multiple forward error correction (FEC) blocks having a same size according to the segmentation rule for the first index corresponding to each burst size larger than the predetermined size.

17. The non-transitory computer-readable medium of claim 16, wherein the MAP IE comprises a download (DL) MAP IE, and the burst size corresponds to a size of a download burst.

18. The non-transitory computer-readable medium of claim 16, wherein the MAP IE comprises an upload (UL) MAP IE, and the burst size corresponds to a size of an upload burst.

19. A mobile station, comprising:
- at least one antenna;
- a physical layer of the mobile station coupled to the at least one antenna to receive MAP information elements (IEs) from a base station, the physical layer being to determine a burst size using information retrieved from the MAP IEs, the retrieved information being indicative of a number of logical resource units (LRUs) allocated for the burst and an index to a first table, the first table comprising a modulation order M for the burst as a function of the number LRUs allocated for the burst and as a function of spectral efficiency of the burst, the burst size being determined based on a second index to a burst size table, the burst size table comprising a burst size and a segmentation rule for the burst as a function of the second index the second index being derived from the information indicative of the number of LRUs allocated for the burst and the first index, burst sizes in the burst size table being are independent of the number of LRUs allocated for the burst;
- wherein burst sizes larger than a predetermined size are segmented into multiple forward error correction (FEC) blocks having a same size according to the segmentation rule for the second index corresponding to each burst size larger than the predetermined size.

20. The mobile station of claim 19, wherein the physical layer is further operable to include multiple forward error correction (FEC) blocks of equal size for bursts greater than 600 bytes.

21. A mobile station, comprising:
- at least one antenna;
- a physical layer of the mobile station coupled to the at least one antenna, the physical layer supporting a set of burst sizes that are within a range of minimal spectral efficiency to maximal spectral efficiency for all allocation sizes, the physical layer being operable to determine a burst size from a burst size table based on a first index formed from information retrieved from a MAP information element (IE), the retrieved formation being indicative of a number of logical resource units (LRUs) allocated for the burst and a second index to a second table, the second table comprising a modulation order M for the burst as a function of the number LRUs allocated for the burst and as a function of a spectral efficiency of the burst within the range of the minimal spectral efficiency to the maximal spectral efficiency, the burst size table comprising a burst size and a segmentation rule for the burst as a function of the first index, burst sizes in the burst size table being independent of the allocation sizes, and the first index comprising the retrieved information being indicative of a number of logical resource units (LRUs) allocated for the burst and the second index;
- wherein burst sizes larger than a predetermined size are segmented into multiple forward error correction (FEC) blocks having a same size according to the segmentation rule for the second index corresponding to each burst size larger than the predetermined size.

22. The mobile station of claim 21, wherein the physical layer is further operable to provide adaptive Hybrid Automatic Repeat reQuest (HARQ) in which original transmissions and re-transmissions have common burst sizes and different allocation sizes.

23. The mobile station of claim 21, further comprising a media access control layer to determine the burst sizes.

* * * * *